United States Patent
Gulati et al.

(10) Patent No.: US 11,902,955 B2
(45) Date of Patent: Feb. 13, 2024

(54) DIRECTIONAL DATA TRANSMISSION TECHNIQUES IN SIDELINK COMMUNICATIONS

(71) Applicant: QUALCOMM Incorporated, San Diego, CA (US)

(72) Inventors: Kapil Gulati, Belle Mead, NJ (US); Sourjya Dutta, San Diego, CA (US); Dan Vassilovski, Del Mar, CA (US); Hong Cheng, Basking Ridge, NJ (US); Qing Li, Princeton Junction, NJ (US); Junyi Li, Fairless Hills, PA (US); Sony Akkarakaran, Poway, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 213 days.

(21) Appl. No.: 17/469,184

(22) Filed: Sep. 8, 2021

(65) Prior Publication Data
US 2023/0085164 A1 Mar. 16, 2023

(51) Int. Cl.
*H04W 72/044* (2023.01)
*H04W 4/40* (2018.01)
*H04W 72/543* (2023.01)

(52) U.S. Cl.
CPC .......... *H04W 72/046* (2013.01); *H04W 4/40* (2018.02); *H04W 72/543* (2023.01)

(58) Field of Classification Search
CPC .... H04W 72/046; H04W 4/40; H04W 72/543
See application file for complete search history.

(56) References Cited

U.S. PATENT DOCUMENTS

2017/0105227 A1* 4/2017 Pinheiro ............. H04W 72/543
2020/0322774 A1 10/2020 Vargas et al.
(Continued)

FOREIGN PATENT DOCUMENTS

WO WO-2021044382 A1 * 3/2021 ........... H04B 7/0404

OTHER PUBLICATIONS

Interdigital Inc: "Qos Management for NR V2X", 3GPP RAN WG2 Meeting #103bis, R2-1814018, 3rd Generation Partnership Project, Mobile Competence Centre, 650, Route Des Lucioles, F-06921 Sophia-Antipolis Cedex, France, vol. RAN WG2, No. Chengdu, China, Oct. 8, 2018-Oct. 12, 2018, Sep. 28, 2018, XP051523480, 4 Pages.

(Continued)

*Primary Examiner* — Chi H Pham
*Assistant Examiner* — Weibin Huang
(74) *Attorney, Agent, or Firm* — Dalei Dong; Holland & Hart LLP

(57) ABSTRACT

Methods, systems, and devices for wireless communications are described that provide for directional quality of service (QoS) targets of a user equipment (UE) for directional communications to multiple UEs in multiple directions. An application layer of the UE may provide data with multiple different directional QoS targets, that may be mapped to multiple QoS data flows that are each configured with different directional QoS targets such as direction and priority associated with the direction. The data may be duplicated for each of the multiple QoS data flows having different QoS parameters, and each QoS data flow may be transmitted in a different direction using a different beam.

26 Claims, 12 Drawing Sheets

(56) References Cited

U.S. PATENT DOCUMENTS

| | | | |
|---|---|---|---|
| 2021/0144727 A1* | 5/2021 | Pan | H04W 4/40 |
| 2022/0150754 A1* | 5/2022 | Perras | H04W 84/18 |
| 2022/0295337 A1* | 9/2022 | Kim | H04W 76/14 |
| 2022/0394676 A1* | 12/2022 | Han | H04W 72/543 |

OTHER PUBLICATIONS

International Search Report and Written Opinion—PCT/US2022/039705—ISA/EPO—Oct. 31, 2022 (2104242WO).

* cited by examiner

DIRECTIONAL DATA TRANSMISSION TECHNIQUES IN SIDELINK COMMUNICATIONS

FIELD OF TECHNOLOGY

The following relates to wireless communications, including directional data transmission techniques in sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some wireless communications systems, a base station may configure UEs for sidelink transmission. The base station may configure time and frequency resources for the UEs to perform the sidelink transmission. In some cases, sidelink communications may use transmission beams that have directional properties, such that different beams are used by a UE for communications with other UEs in two or more different directions. Efficient techniques for beamformed communications with different UEs using different beams may help to enhance overall communications efficiency and reliability.

SUMMARY

The described techniques relate to improved methods, systems, devices, and apparatuses that support directional data transmission techniques in sidelink communications. In accordance with various aspects, the described techniques provide for directional quality of service (QoS) targets of a user equipment (UE) for directional communications to different UEs in different directions. In some cases, an application layer of the UE may provide data with multiple different directional QoS targets, that may be mapped to multiple QoS data flows that are each configured with different directional QoS targets (e.g., direction, priority associated with the direction, and HARQ attributes associated with the direction). The data may be duplicated for each of the multiple QoS data flows, and each QoS data flow may be transmitted in a different direction using a different beam. In some cases, a vehicle-to-everything (V2X) layer at the UE may receive information from an access stratum layer that indicates multiple precoders associated with different directions, and the V2X layer may map the QoS flows to different precoders based on the respective directions. The V2X layer may duplicate the data flow into the multiple different QoS flows and provides each QOS flow to lower layers for transmission in accordance with the respective QoS parameters using the associated precoder.

A method for wireless communication at a first user equipment (UE) is described. The method may include receiving a directional indication associated with a set of data packets that are to be transmitted in one or more communications to one or more other UEs, determining two or more directional traffic flows associated with two or more beams of the first UE based on the directional indication associated with the set of data packets, the two or more directional traffic flows including at least a first directional traffic flow and a second directional traffic flow, and setting a first set of quality of service (QoS) parameters for the first directional traffic flow and a second set of QoS parameters for the second directional traffic flow based on the directional indication associated with the set of data packets.

An apparatus for wireless communication at a first UE is described. The apparatus may include a processor, memory coupled with the processor, and instructions stored in the memory. The instructions may be executable by the processor to cause the apparatus to receive a directional indication associated with a set of data packets that are to be transmitted in one or more communications to one or more other UEs, determine two or more directional traffic flows associated with two or more beams of the first UE based on the directional indication associated with the set of data packets, the two or more directional traffic flows including at least a first directional traffic flow and a second directional traffic flow, and set a first set of quality of service (QoS) parameters for the first directional traffic flow and a second set of QoS parameters for the second directional traffic flow based on the directional indication associated with the set of data packets.

Another apparatus for wireless communication at a first UE is described. The apparatus may include means for receiving a directional indication associated with a set of data packets that are to be transmitted in one or more communications to one or more other UEs, means for determining two or more directional traffic flows associated with two or more beams of the first UE based on the directional indication associated with the set of data packets, the two or more directional traffic flows including at least a first directional traffic flow and a second directional traffic flow, and means for setting a first set of quality of service (QoS) parameters for the first directional traffic flow and a second set of QoS parameters for the second directional traffic flow based on the directional indication associated with the set of data packets.

A non-transitory computer-readable medium storing code for wireless communication at a first UE is described. The code may include instructions executable by a processor to receive a directional indication associated with a set of data packets that are to be transmitted in one or more communications to one or more other UEs, determine two or more directional traffic flows associated with two or more beams of the first UE based on the directional indication associated with the set of data packets, the two or more directional traffic flows including at least a first directional traffic flow and a second directional traffic flow, and set a first set of quality of service (QoS) parameters for the first directional traffic flow and a second set of QoS parameters for the second directional traffic flow based on the directional indication associated with the set of data packets.

Some examples of the method, apparatuses, and non-transitory computer-readable medium described herein may further include operations, features, means, or instructions for duplicating the set of data packets for each of the two or more directional traffic flows and transmitting the set of data packets on each of the first directional traffic flow and the second directional traffic flow, where each directional traffic flow of the two or more directional traffic flows are independently processed according to the respective set of QoS parameters of the associated directional traffic flow. In some examples of the method, apparatuses, and non-transitory computer-readable medium described herein, the directional indication is received from an application layer of the first UE, and where the determining and setting is performed at a V2X layer of the first UE.

In some examples of the method, apparatuses, and non-transitory computer-readable medium described herein, the determining the two or more directional traffic flows may include operations, features, means, or instructions for receiving, from an access stratum layer of the first UE, a mapping of a first precoder to a first beam having a first directional relationship with the first UE and a second precoder to a second beam having a second directional relationship with the first UE, mapping the first directional traffic flow to the first precoder based on the first directional traffic flow having the first directional relationship with the first UE, and mapping the second directional traffic flow to the second precoder based on the second directional traffic flow having the second directional relationship with the first UE. In some examples of the method, apparatuses, and non-transitory computer-readable medium described herein, the first set of QoS parameters include one or more of a first priority, a first latency target, a first reliability target, a first distance range for feedback operations, or any combinations thereof and the second set of QoS parameters are determined independently of the first set of QoS parameters and include one or more of a second priority, a second latency target, a second reliability target, a second distance range for feedback operations, or any combinations thereof.

In some examples of the method, apparatuses, and non-transitory computer-readable medium described herein, the directional indication associated with the set of data packets indicates one or more directions relative to a direction of motion of the first UE, or relative to a reference direction heading. In some examples of the method, apparatuses, and non-transitory computer-readable medium described herein, the directional indication associated with the set of data packets indicates two or more directions that each may have an associated set of QoS targets, and where the two or more directions may be mapped to two or more transmission beams that are to be used to transmit the first directional traffic flow and the second directional traffic flow. In some examples of the method, apparatuses, and non-transitory computer-readable medium described herein, a quantity of directional traffic flows that are available to the first UE are determined based on a capability of the first UE for concurrent transmission using two or more precoders, a number of available transmission/reception points for communications with the other UEs, or any combinations thereof.

In some examples of the method, apparatuses, and non-transitory computer-readable medium described herein, the first directional traffic flow may be mapped to a first transmission beam and the second directional traffic flow may be mapped to a second transmission beam, and where the first set of QoS parameters and the second set of QoS parameters are configured independently of each other. In some examples of the method, apparatuses, and non-transitory computer-readable medium described herein, a first transmission precoder associated with the first transmission beam and the first set of QoS parameters are provided as attributes to each packet in the first directional traffic flow that are passed to a lower layer of the first UE for use in transmission of each respective packet and a second transmission precoder associated with the second transmission beam and the second set of QoS parameters are provided as attributes to each packet in the second directional traffic flow that are passed to the lower layer of the first UE for use in transmission of each respective packet.

Some examples of the method, apparatuses, and non-transitory computer-readable medium described herein may further include operations, features, means, or instructions for determining that two or more packets of the set of data packets have different QoS parameters and are to be transmitted in the first directional traffic flow and selecting a more stringent QoS parameter associated with the two or more packets for inclusion with the first set of QoS parameters. In some examples of the method, apparatuses, and non-transitory computer-readable medium described herein, two or more packets having different QoS parameters and are not permitted to be transmitted in a single directional traffic flow.

In some examples of the method, apparatuses, and non-transitory computer-readable medium described herein, the first directional traffic flow and the second directional traffic flow are configured based on a mapping between the directional indication and one or more of a predetermined set of QoS parameters, a set of precoding parameters associated with different directional traffic flows, or any combinations thereof. In some examples of the method, apparatuses, and non-transitory computer-readable medium described herein, each of the two or more directional traffic flows are mapped to a different sidelink radio bearer, and where the respective set of QoS parameters are configured as part of a sidelink radio bearer configuration.

In some examples of the method, apparatuses, and non-transitory computer-readable medium described herein, the directional indication indicates different QoS targets for each of two or more different directions relative to a direction associated with the first UE, and where each of the two or more different directions are mapped to a different directional traffic flow of the two or more directional traffic flows. In some examples of the method, apparatuses, and non-transitory computer-readable medium described herein, the directional indication indicates different QoS targets for each of a set of multiple different directions relative to a direction associated with the first UE, and two or more different directions of the set of multiple different directions are mapped to the first directional traffic flow, and where the first set of QoS parameters are based on more stringent QoS targets of the two or more different directions that are mapped to the first directional traffic flow.

DETAILED DESCRIPTION

Figure 1:
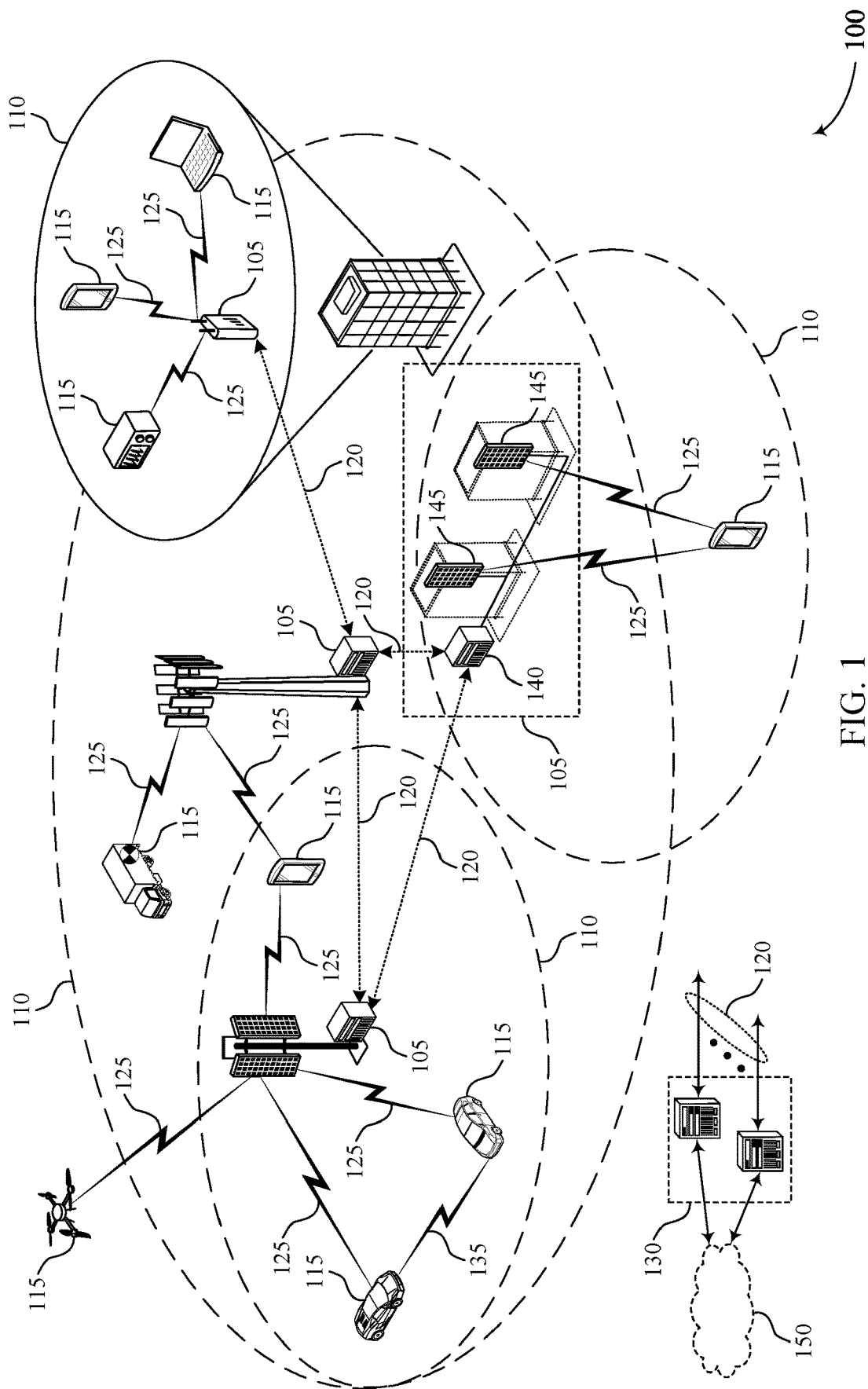
FIG. 1 illustrates an example of a wireless communications system that supports directional data transmission techniques in sidelink communications in accordance with aspects of the present disclosure.

In some wireless communications systems, a user equipment (UE) may communication directly with one or more other UEs using direct UE-to-UE communications, which may be referred to as sidelink communications or PC5 communications. For example, UEs may be associated with vehicles and sidelink communications between UEs may provide information for use by the vehicles provided in accordance vehicle-to-everything (V2X) communications techniques. In some cases, V2X communications may be used for different functions, such as collision warning, object detection, and lane change notifications. Communications associated with these different functions are more important for certain other vehicles/UEs in different directions from the transmitting UE, based on which function has data in a transmission. For example, V2X collision warning communications are more important for UEs in front of the transmitting UE than UEs to the side or behind. Similarly, object detection communications are more important to vehicles behind the transmitter, and lane change communications are more important to vehicles to the side or behind the transmitter. Existing V2X sidelink communications do not differentiate quality of service (QoS) parameters for data transmissions based on a direction associated with the function that triggers a communication, and all V2X data flows are treated as having a same QoS for transmission by the transmitting UE. This may cause inefficiencies in the system due to wasted resources for transmissions/retransmissions in non-preferred directions, increased latency, and reduced reliability.

In accordance with various techniques discussed herein, directional QoS targets may be provided, in which an application layer (e.g., that supports an active driving assistance application at a vehicle) provides data (e.g., a set of data packets) with directional QoS target to a V2X layer (or other device-to-device (D2D) communication layer), and the V2X layer may map the provided data to multiple QoS data flows that are each configured with different directional QoS targets (e.g., direction, priority associated with the direction, and HARQ attributes associated with the direction, or any combinations thereof), and provide the QoS data flows to an access stratum layer (e.g., a packet data convergence protocol (PDCP) layer through a physical PHY) layer) for transmission to other UEs. In some cases, the V2X layer may receive information from the access stratum layer that indicates multiple precoders associated with different directions of the UE, and the V2X layer may map the QoS flows to different precoders based on the respective directions. The V2X layer may duplicate the set of data packets into the multiple different QoS flows and provides each QOS flow to the lower layers (e.g., the access stratum) for transmission in accordance with the respective QoS parameters using the associated precoder.

In some cases, the application layer (such as an application used for driving a vehicle) may have access to sensor information. The sensor information may be self-sensed or received from other devices. This sensor information and information related to the application may be used to determine whether a message to be sent over the V2X network is more relevant in some directions rather than others. When a message is more relevant in some directions and not others, the message (or data packet) has directionality. This directionality may be used by an application layer to determine directional QoS parameters for the message.

In some cases, different QoS parameters may be mapped to two or more different more radio bearers at the access stratum layer. The mapping may be to two or more directions, antenna panels, precoders, or combinations thereof, for example. In some cases, the UE may duplicate the set of data packets for transmission according to the mapping. Any subsequent data packets generated at the UE may be mapped using the QoS flows, or new QoS flows may be mapped to the radio bearers in a different way.

Such QoS beamformed sidelink communications techniques may improve efficiency because the UE may transmit data packets using QoS parameters that are more relevant to different directions, instead of a same set of QoS parameters in all directions (i.e., covering the 360-degree angular space). This may improve network efficiency in terms of power and time, may reduce interference, and may improve efficiency for mmW broadcast and groupcast operations.

Aspects of the disclosure are initially described in the context of wireless communications systems. Aspects of the disclosure are further illustrated by and described with reference to protocol stack architecture, block diagrams, process flows, and flowcharts. Aspects of the disclosure are further illustrated by and described with reference to apparatus diagrams, system diagrams, and flowcharts that relate to directional data transmission techniques in sidelink communications.

FIG. 1 illustrates an example of a wireless communications system 100 that supports directional data transmission techniques in sidelink communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125.

The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using V2X communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User Internet Protocol (IP) packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE- Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. A beam may also be referred to as a transmit spatial configuration. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some cases, a UE 115 may use techniques described herein to provide directional quality of service for beamformed sidelink communications in multiple different directions which each have a different QoS. In some cases, the UE 115 may generate a data packet associated with sensor information or application information and determine a directional parameter for the data packet based at least in part on the sensor information or the application information. The UE 115 may map the data packet to two or more QoS flows, which each QoS flow having a directional parameter associated with a different direction relative to the UE 115. Each QoS flow may be mapped to at least one radio bearer based at least in part on the directional QoS parameter. The data packet may be duplicated for each QoS flow, and provided to lower layers for transmission via the mapped radio bearers and associated QoS parameters.

In some cases, an application at the UE 115 may provide the ability to use directionality information to determine relevant directions that a data packet would be relevant in for sidelink communications. The UE 115 may use this information to transmit the data packet with different QoS parameters (e.g., to provide enhanced reliability in certain directions) on the QoS flows, which may improve reliability and reduce interference. Thus, techniques as discussed herein may improve efficient use of network resources, reduce power consumption, and improve throughput and reliability of communications.

Figure 2:
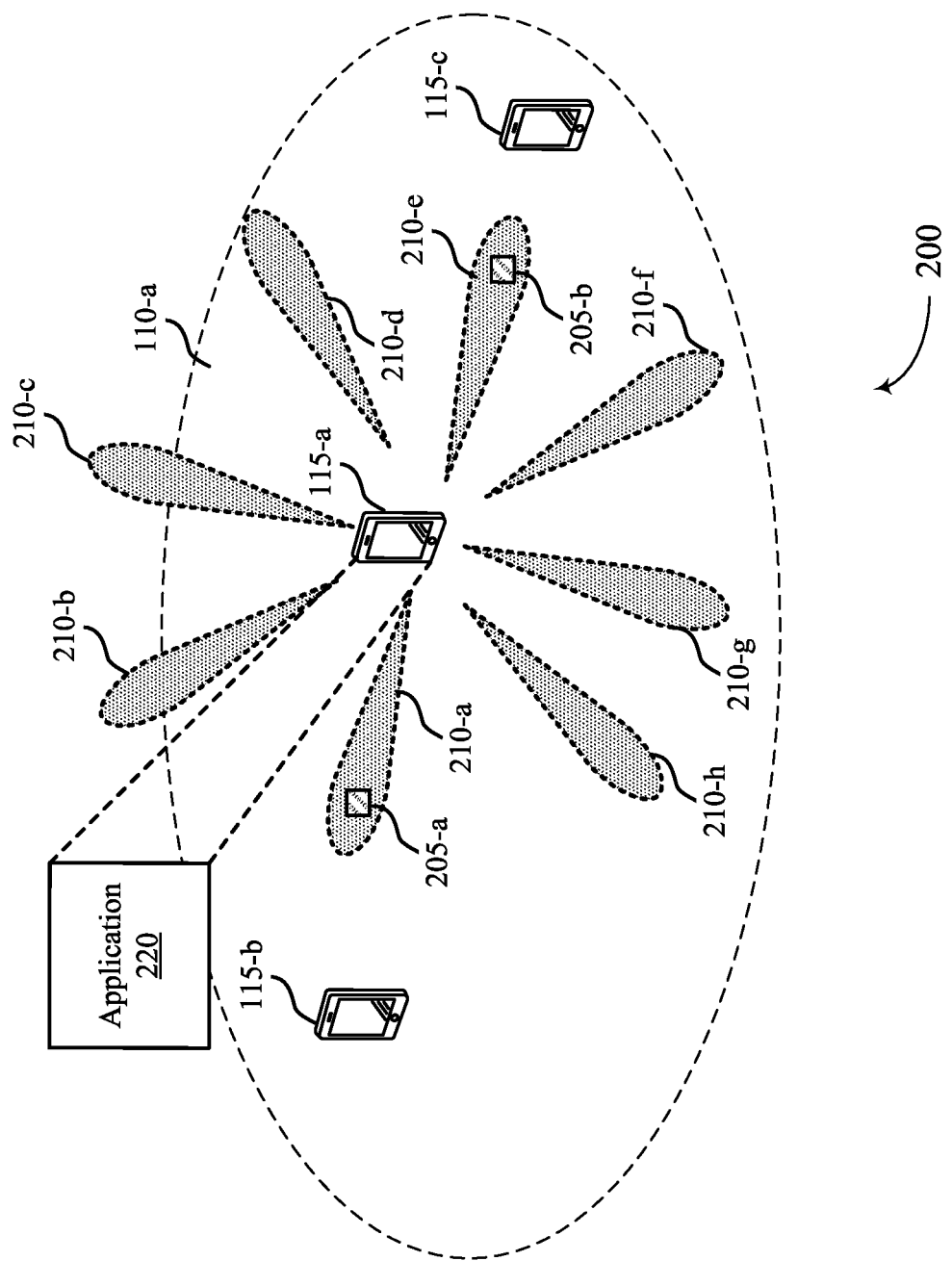
FIG. 2 illustrates an example of a portion of a wireless communications system that supports directional data transmission techniques in sidelink communications in accordance with aspects of the present disclosure.

FIG. 2 illustrates an example of a wireless communications system 200 that supports directional data transmission techniques in sidelink communications in accordance with aspects of the present disclosure. In some examples, the wireless communications system 200 may implement aspects of wireless communications system 100. For example, the wireless communications system 200 includes UEs 115 that may be examples of one or more aspects of UEs 115 as described with reference to FIG. 1.

In this example, a first UE 115-a may have a coverage area 110-a that may include a second UE 115-b and a third UE 115-c, where the second UE 115-b and third UE 115-c are in different directions relative to the first UE 115-a. The UEs 115 may communicate via sidelink communications. The wireless communications system 200 may be any type of communications system that can support direct D2D connectivity via sidelink transmissions. Examples of the wireless communications system 200 may include a V2V communications system, a V2X communications system, a V2N communications system, a P2P communications system, an IoT communications system, an IoE communications system, an industrial IoT (IIoT) communications system, an MTC communications system, and combinations thereof. One or more of the UEs 115 may be mounted on or otherwise included within a vehicle, an appliance, a meter, a machine, among other examples. For purposes of illustration, the wireless communications system 200 will be discussed in terms of a V2X communications system, however, the wireless communications system 200 may be any type of communications system that supports D2D connectivity.

The first UE 115-a may be running an application 220. In this example, the application 220 may be a V2X application, which can generate data packets, such as data packet 205, relevant for a V2X communications system. Examples of such data packets may relate to traffic conditions, signal scheduling, weather, safety, emergencies, or any other information relevant in a V2X communications system. The first UE 115-a may be capable of transmitting data packets in a 360-degree angular space, as represented by beams 210-a through 210-h (collectively referred to herein as beams 210). However, it may not always be efficient or necessary to transmit a data packet, such as data packet 205, within the 360-degree angular space. Techniques described herein support the UE 115-a to determine a directionality of a data packet and to transmit the data packet only in those relevant directions while meeting QoS requirements.

V2X data packets (or data packets of other types of sidelink communications) may have information that is relevant only in certain directions. For example, the application 220 may generate the data packet 205, which may have some directionality. That is, at least some of the information in the data packet 205 is more relevant in some directions than on other directions. Examples of data packets 205 having directionality may include message exchanges for the purpose of forward collision warning, which may be more important in forward direction (e.g., the approaching direction), sensor sharing message with information regarding objects (e.g., a tire or pedestrian in the roadway) detected in the front direction, which may be more important to be sent in the back direction (e.g., the receding direction), and coordinated driving message for lane changes, which may be more relevant for the side and back directions. Other examples are contemplated as well, such as, for example, if the UE 115-a senses it is at the end of a queue and there is no one behind the UE 115-a to send a message to, the UE 115-a may not send the message in the rearward direction or adjust one or more QoS parameters for rearward transmission (e.g., to enable non-feedback based HARQ). In the V2X example, there are certain applications where it might be more beneficial to efficiently transmit a message in key directions than to transmit it to everyone within proximity of the vehicle. This may also be relevant in the cases regarding beamformed broadcast and groupcast over sidelink.

In the example of FIG. 2, the UE 115-a may beamform sidelink communications in higher frequency ranges (e.g., mm-Wave) to meet range and QoS requirements. Sidelink communications designed for sub-6 GHz communications may require transmitting a copy of the data packet 205 in all direction covering the 360-degree angular space around the UE 115-a (e.g., using an omni-directional transmission). However, in mmW frequencies that use beams 210, transmitting the data packet 205 in all directions may be inefficient as many directions may not have any users or interested users. As shown in the example of FIG. 2, only a first beam 210-a and a second beam 210-e have interested users at second UE 115-b and third UE 115-c.

Techniques described herein may use directionality information from the application 220 to determine in which directions to transmit the data packet 205, and associated QoS parameters associated with the determined directions. The application 220, at the application layer of the first UE 115-a, may have directionality information based at least in part on requirements of the application 220 and sensing and location information. For example, sensors such as cameras, proximity sensors, infrared sensors, light sensors, ultrasonic sensors, sonic sensors, seismic sensors, accelerometers, gyroscopes, temperature sensors, radar, lidar, pressure sensors, smoke sensors, gas sensors, alcohol sensors, liquid flow sensors, biometrics sensors, or the like, may provide the application 220 with sensor information that may relate to directionality. One or more sensors may be located on the first UE 115-*a* or may be located elsewhere. The UE 115-*a* may receive the sensor information directly (e.g., when the sensor is on the first UE 115-*a*) or via wired or wireless communications (e.g., when the sensor is external to the first UE 115-*a*).

For example, the first UE 115-*a* may include a proximity sensor that detects an object close to the first UE 115-*a*, such as an obstacle in the roadway. The first UE 115-*a* may provide this sensor information to the application 220, which may use the sensor information to determine a directionality for a message that warns others on the roadway about the obstacle. Other sensor information or application information may include one or more of sensor information from another wireless device in communication with the UE, sensor information from one or more sensors of the UE, a current or upcoming movement of the UE, a current or upcoming location of the UE, map information related to the UE, sensor data sharing or fusing, a type of content in the data packet, a communication mode, a service type associated with the data packet, a user intention, or the like.

In some examples, the application 220 may have information that relates to directionality of the data packets that it generates. The application layer associated with the application 220 may be able to determine the general relevance of the directionality. For example, if the driver of the vehicle carrying first UE 115-*a* intends to turn left by engaging the left turn signal, the application layer may determine application information for a message to inform other drivers that the vehicle will be turning left. As used herein, a driver may refer to a person driving a vehicle or to an autonomous vehicle itself. The application 220 may use the application information to determine directionality for the message, such as to the left and behind the first UE 115-*a*.

Techniques described herein provide use application information or sensor information to inform lower layers (e.g., an access stratum layer) of how to transmit the data packet for efficient sidelink transmissions over mmW bands. The techniques described herein beamform messages that meet QoS requirements without transmitting the message omni-directionally or over a broad beam where it may include areas with few or no interested users. In some cases, directionality may be provided with reference to vehicle mobility (e.g., heading, opposite to heading, side left, side right), may include azimuth and elevation (e.g., packets meant for pedestrian vs trucks), may be defined in different quantization (e.g., heading+[0-10], +[10-20], +, etc.), or any combinations thereof, based on information from the application 220. In some cases, the packet 205 may be one packet of a set of packets or a packet in a data flow from the application 220, and the associated directional QoS may be semi-static (e.g., the QoS is not changing dynamically from packet to packet). In some cases, the QoS parameters associated with the packet 205 may include parameters that are mapped to a standardized PC5 QoS identifier (PQI) per-data flow, a resource type (e.g., guaranteed bit rate (GBR), delay critical GBR, or Non-GBR), a priority level, a packet delay budget, a packet error rate, an averaging window (e.g., for GBR and Delay-critical GBR resource types), a maximum data burst volume (e.g., for delay-critical GBR resource type). Further, in some cases, one or more additional QoS parameters may be provided for dynamic control on a per-packet basis, such as a range parameter (e.g., a minimum distance where the QoS parameters are to be fulfilled) for V2X groupcast communications. Examples of QoS data flows for different directional communications in a UE protocol stack are discussed in more detail with reference to FIGS. 3 and 4.

Figure 3:
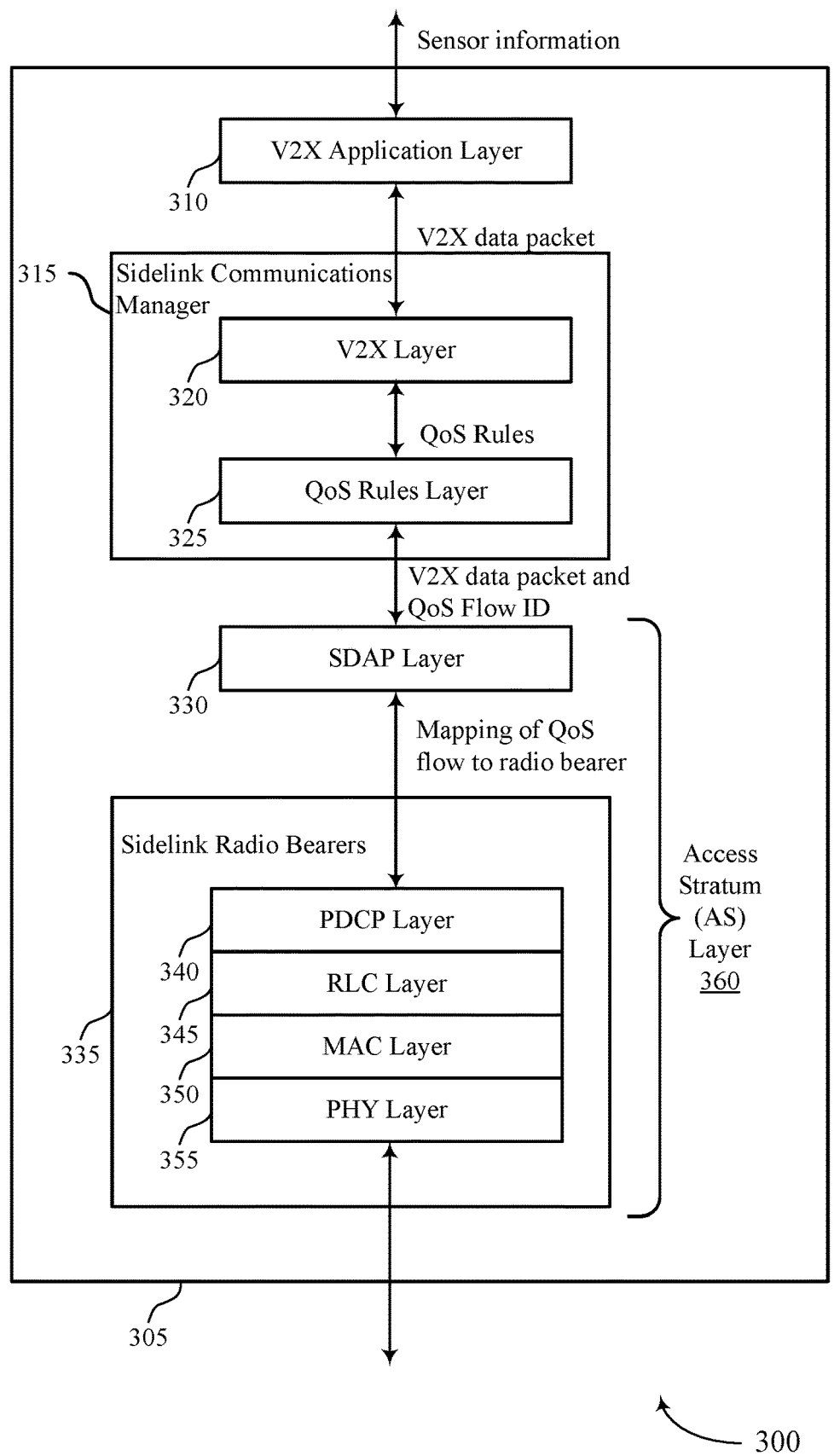
FIG. 3 illustrates an example of a protocol stack architecture that supports directional data transmission techniques in sidelink communications in accordance with aspects of the present disclosure.

FIG. 3 illustrates an example of a protocol stack architecture 300 that supports directional data transmission techniques in sidelink communications in accordance with aspects of the present disclosure. The architecture 300 may implement aspects of wireless communications system 100 and 200 as described with reference in FIGS. 1 and 2. The architecture 300 may be included in a UE 115 as described with reference in FIGS. 1 and 2. The architecture 300 may include represent a protocol stack 305 within a UE, which includes a V2X application layer 310, a sidelink communication manager 315, and an access stratum layer 360.

The architecture 300 may use a per-flow QoS model for QoS management of data packets to be transmitted by the UE. The example protocol stack 305 is discussed with respect to V2X, although any type of D2D system may use similar architecture. The example of protocol stack 305 may include NR-based Proximity Services (ProSe) communications over the proximity controller 5 (PC5) reference point. Other examples use other types of proximity-based services, such as PC2. NR-based ProSe may support three communication modes (e.g., cast types), i.e. broadcast, groupcast, and unicast, which may have their own QoS requirements.

The V2X application layer 310 may set the V2X application requirements. That is, the V2X application layer 310 can determine the application requirements through a PQI and a range model in NR. A PQI range model in the NR standards defines a PC5 QoS identifier and a range. The range is in the form of distance that may indicate a minimum distance in which the QoS parameters need to be fulfilled. The range parameter may be passed to the AS layer 360 along with the QoS parameters for dynamic control. Other parameters may be included such as delay budget, priority, GBR, a minimum bit rate, a range, a maximum data burst volume, a standardized QoS index, or a packet error rate. These parameters may be different or the same for each direction of transmission for the data packet.

The V2X application layer 310 may provide the information and the data packet to the V2X layer 320 at the sidelink communication manager 315. In some examples, the V2X layer 320 may be, for example, a P2P layer. The V2X layer 320 may create the PC5 QoS rules based on the application. The V2X layer 320 may map the V2X data packets to PC5 QoS flows and apply a PC5 QoS flow identifiers (PFIs). For one or more PC5 QoS flows, V2X data packets may be duplicated and mapped to different QoS flows, as will be discussed in more detail with reference to FIG. 4, where each QoS flow may be marked with the same PFI.

A QoS rules layer 325 (which may be a PC5 QoS rules layer) may set a packet filter. The QoS rules layer 325 may perform any classification and marking of PC5 user plane traffic, i.e., the association of PC5 traffic to QoS flows. The QoS rules layer 325 may be part of the V2X layer 320 in some examples. The V2X layer 220 may determine what the QoS rules are going to be, which may be based on V2X application layer 310 indications.

The access stratum layer 360 may be responsible for transmission of the data packet. The access stratum layer 360 may include a service data adaptation protocol (SDAP) layer 330 and sidelink radio bearers 335, which each are associated with a PDCP layer 340, an RLC layer 345, a MAC layer 350, and a physical (PHY) layer 355. The SDAP layer 330 may receive the PC5 QoS flow information from the V2X layer 320 or the QoS rules layer 325. The SDAP layer 330 may translate the PC5 QoS flows to different radio bearer 335. Each radio bearer 335 may have its own PC5 QoS mapping.

The AS layer 360 may map the PC5 QoS flows to AS layer resources, and each PFI may be mapped to a particular radio bearer. For example, some QoS flows may be mapped to the same link but with different radio bearers. A radio bearer determines the QoS that is required over the air. A link is defined by the two end points (e.g., first UE 115-a to second UE 115-b, and first UE 115-a to third UE 115-c, in FIG. 2). In some cases, if no existing established radio bearers are good to meet the QoS requirements for a QoS-flow, then a new bearer may be setup and the subsequent layers configured with the bearer specific configuration (e.g., transmission parameters to meet the QoS requirements, etc.). In some existing systems, there is not support of directional QoS indication from the application, and the UE layers thus assume omni-coverage requirements. Further, such systems may not provide support of beam-swept transmissions in sidelink MAC. Various techniques as discussed herein provide that one or more packets may be duplicated and assigned to different QoS flows, an example of which is discussed with reference to FIG. 4.

Figure 4:
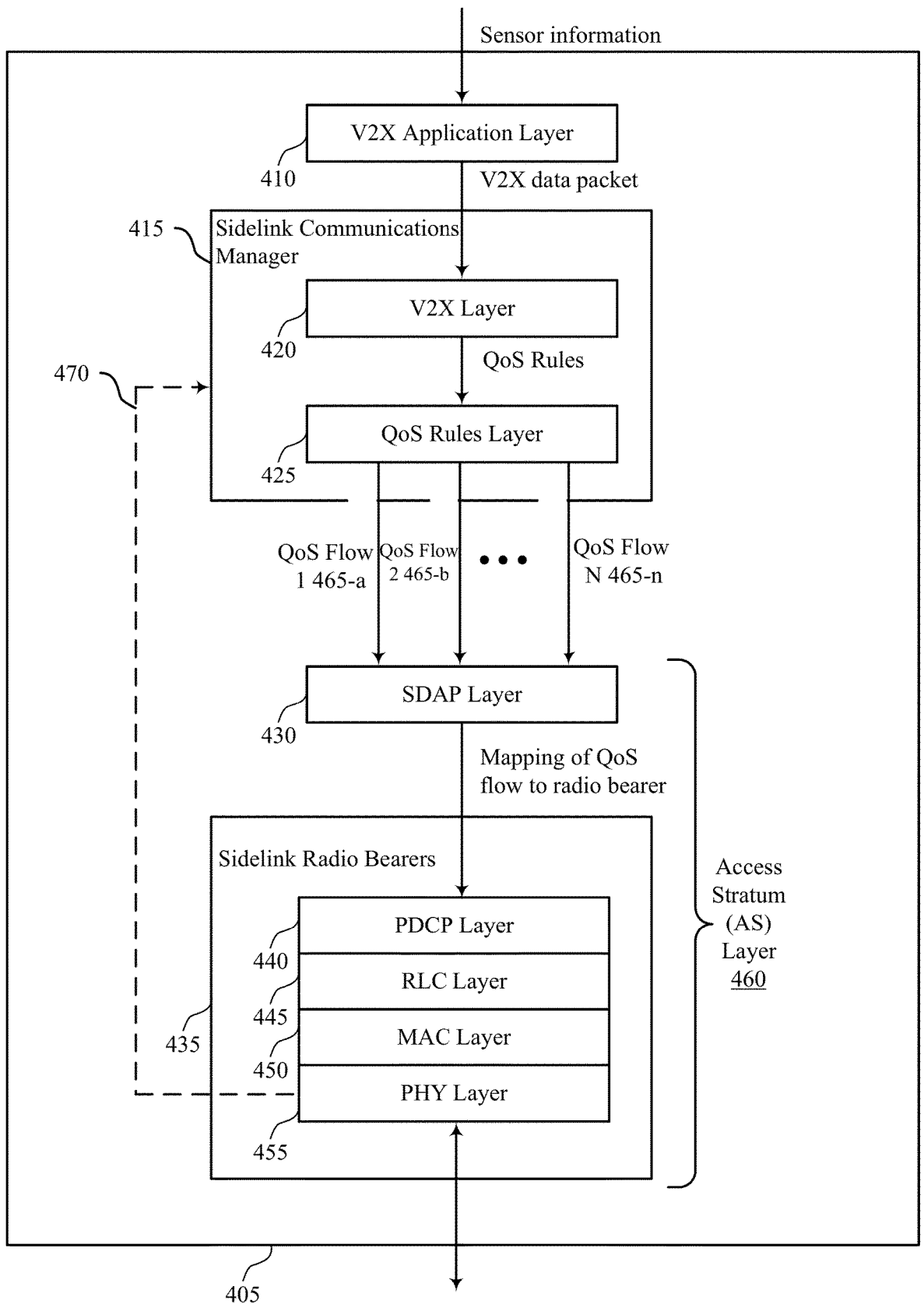
FIG. 4 illustrates another example of a protocol stack architecture that supports directional data transmission techniques in sidelink communications in accordance with aspects of the present disclosure.

FIG. 4 illustrates an example of a protocol stack architecture 400 that supports directional data transmission techniques in sidelink communications in accordance with aspects of the present disclosure. The architecture 400 may implement aspects of wireless communications system 100 and 200 as described with reference in FIGS. 1 and 2. The architecture 400 may be included in a UE 115 as described with reference in FIGS. 1 and 2. The architecture 400 may include represent a protocol stack 405 within a UE, which includes a V2X application layer 410, a sidelink communication manager 415, and an access stratum layer 460, similarly as discussed with reference to FIG. 3.

In this example, similar as discussed with reference to FIG. 3, the architecture 400 may use a per-flow QoS model for QoS management of data packets to be transmitted by the UE. The V2X application layer 410 may set the V2X application requirements through a PQI and a range model in NR. The range parameter may be passed to the AS layer 460 along with the QoS parameters for dynamic control. The V2X application layer 410 may provide the information and the data packet to the V2X layer 420 at the sidelink communication manager 415. In some examples, the V2X layer 420 may be, for example, a P2P layer. The V2X layer 420 may create the PC5 QoS rules based on the application. The V2X layer 420 may map the V2X data packets to PC5 QoS flows and apply a PC5 QoS flow identifiers (PFIs). A QoS rules layer 425 (which may be a PC5 QoS rules layer) may set a packet filter. The QoS rules layer 425 may perform any classification and marking of PC5 user plane traffic, i.e., the association of PC5 traffic to QoS flows. For one or more PC5 QoS flows, V2X data packets may be duplicated and mapped to different QoS flows, including a first QoS flow 465-a, a second QoS flow 465-b, and an n-th QoS flow 465-n. In some cases, the QoS flows 465 may have different QoS parameters, which may be based on V2X application layer 410 indications.

The access stratum layer 460, similarly as discussed with reference to FIG. 3, may transmit the data packets of the different QoS flows 465. The access stratum layer 460 may include a service data adaptation protocol (SDAP) layer 430 and sidelink radio bearers 435, which each are associated with a PDCP layer 440, an RLC layer 445, a MAC layer 450, and a physical (PHY) layer 455. The SDAP layer 430 may receive the PC5 QoS flow information from the V2X layer 420 or the QoS rules layer 425. The SDAP layer 430 may translate the PC5 QoS flows to different radio bearer 435. Each radio bearer 435 may have its own PC5 QoS mapping.

In some cases, to meet directional transmission coverage, the UE may prefer to form multiple transmit beams to transmit data packets for a data flow (e.g. one beam pointing to front, one to back, etc.). In accordance with various techniques discussed herein, the UE may perform packet duplication at higher layers (e.g., V2X layer or SDAP layer or PDCP layer), which may be transparent to the medium access control (MAC) layer at the UE. For example, the V2X application layer 410 may have an application that has a traffic-flow with directional-QoS, such as a front direction with a high priority to be transmitted to receivers having a distance of 100 meters or less, and a rear direction with a lower priority to be transmitted to receivers having a distance of 100 meters or less (e.g., {(front direction, priority high, distance 100 m), (rear direction, priority low, distance 20 m)}). Based on the directional QoS targets, the UE's upper layer (e.g., V2X layer 420 or QoS rules layer 425) may duplicate the packets into QoS flows 465 such as by providing a first copy of the flow/packets with QoS that indicates {(front direction, priority high, distance 100 m)}, and by providing a second copy of the flow/packets with QoS that indicates {(rear direction, priority low, distance 20 m)}. In some cases, each duplicated packet may be tagged with a precoder that will be used to transmit that copy.

In some cases, the V2X data packets from the V2X application layer 410 may be mapped to multiple different QoS flows 465 based on associated directional information, with each constituent QoS flow 465 assigned a QoS flow identifier (QFI) that has an associated set of QoS requirements and UE internal tagging of the transmit precoder to use to transmit for that direction. For example, for a set of data packets with directional QoS from the V2X layer 410, a set of directional parameters may be
{(Heading, priority high, NACK distance 100 m),
(Rear, priority low, NACK distance 20 m),
(side left and side rear, priority medium, NACK distance 50 m)}.
Based on the directional parameters, the UE in this example may determine it will need two precoders (e.g., precoder 1 and precoder 2). In some cases, the precoders may be identified based on a precoder-directional mapping 470 by the PHY layer 455. The mapping of the two QoS flows as follows in this example may thus be:
QoS-flow 1: {(priority high, NACK distance 100 m)}+ Precoder 1 (i.e. for the heading)
QoS-flow 2: {(priority medium, NACK distance 50 m)}+ Precoder 2 (i.e. for side left, side rear, and rear).
It is noted that this example is described for purposes of illustration and discussion only, and other examples may use different numbers of precoders and QoS flows 465 (e.g., the UE may have determined that two precoders are needed for Heading, one precoder is needed for side left, one precoder is needed for side rear, and one precoder is needed for rear, resulting in five different QoS flows).

In some cases, the V2X layer 420 may receive the traffic flow if a set of data packets from the V2X application layer 410 with directional QoS parameters, and determine two or more QoS flows 465 that are to be used to meet the directional QoS parameters of the traffic. The V2X layer 420, in conjunction with the QoS rules layer 425 in this example, may duplicate data packets received for that traffic flow to each of the two or more QoS flows 465. In examples where the QoS rules layer 425 is included within the V2X layer 420, may perform the packet duplication. The UE may transmit multiple instances of the data packets using the two or more QoS flows 465 with each QoS flow 465 independently processing the duplicate copies of packet according to the respective configuration of that QoS flow 465. In some cases, where the directional QoS parameters indicate one or more directions with one more QoS requirements (e.g., priority, latency, reliability, range requirements, or any combinations thereof) are dependent on the one of more directions. In some cases, the directionality may be provided relative to a direction of motion or heading of the transmitting UE (e.g., in the direction of motion, opposite of the direction of motion, perpendicular towards left or right to the direction of motion, and the like). In other cases, the directionality may be provided relative to an absolute direction (e.g., relative to a defined compass heading).

In some cases, the UE may determine the two or more QoS flows 465 based at least in part on the UE's capability to transmit using one or more precoders, a number of transmission-reception points (TRPs) available to the UE for transmission, or any combinations thereof. In some case, each QoS flow 465 may be mapped to a transmit precoder and one or more transmission parameters (e.g., a number of HARQ retransmissions, transmit power, feedback based or non-feedback based HARQ, acknowledgment/negative-acknowledgment (ACK/NACK) or NACK-only HARQ, MCS, or any combinations thereof). In some cases, the transmit precoder and one or more transmission parameters are associated as attributes to each packet (e.g., service data unit (SDU)) in the respective QoS flow 465 and passed down to lower UE layers (e.g., SDAP—PDCP—RLC—MAC—PHY) and used for transmission of the packet.

In some cases, a packet may be split into multiple protocol data units (PDUs) or transport blocks (TBs) at a UE layer, and the associated attributes may be carried over to each of the split PDUs or TBs. In some cases, two or more PDUs or TBs may be combined, and the attributes of the combined PDU/TB may be to provide attributes having more stringent requirements (e.g., the higher number of retransmissions, etc.). In other cases, PDUs or TBs with different sets of attributes (e.g., precoder and transmission parameters) are not permitted to be combined.

In some cases, the configuration of each of the two or more QoS flows 465 may include one or more of a mapping to a defined set of QoS requirements to be met for any packet in that QoS flow 465, and a transmit precoder and transmission parameters. In some cases, each of the two or more QoS flows 465 may be mapped to sidelink radio bearers, and the transmission parameters may be configured as a part of the radio bearer configuration (e.g., by RRC signaling). In some cases, the mapping of a directional traffic flow of data packets to the two or more QoS flows 465 provides that each direction of the traffic flow is mapped to a distinct QoS flow 465. For example, a V2X data packet may have directional parameters of ({Heading, Priority 1, Range 100 m), {Rear, Priority 2, Range 20 m}), and may be mapped to two QoS flows 465, such as first QoS flow 465-*a* with QoS parameters (Priority 1, Range 100 m), and second QoS flow 465-*b* with QoS parameters (Priority 2, Range 20 m). In this example, the precoder-directional mapping 470 may be used to associate the first QoS flow 465-*a* to the heading direction, and to associate the second QoS flow 465-*b* to the rear direction.

In some cases, the mapping of the data packets to the two or more QoS flows 465 may provide that that each of the QoS flows 465 maps to one or more directions in directional requirements for the traffic flow, and the respective QoS parameters for that QoS flow 465 is based on the more stringent requirements for all the directions mapped in that flow. For example, a V2X data packet flow may have parameters:

(Heading, priority high, NACK distance 100 m),
(Rear, priority low, NACK distance 20 m),
(side left and side rear, priority medium, NACK distance 50 m)}, which may be mapped to:

QoS flow 1 having parameters: {(priority high, NACK distance 100 m)}+Precoder 1 (i.e. for heading); and
QoS-flow 2 having parameters: {(priority medium, NACK distance 50 m)}+Precoder 2 (i.e. for side left, side rear, and rear).

The duplicated V2X data packet flow may thus be transmitted using the mapped QoS flows, such that different directional transmissions have different QoS parameters. Such techniques may provide for more reliable communications in directions that are more relevant to the particular V2X data packet flow, and more relaxed QoS parameters in other directions which may enhance efficiency and provide for reduced power consumption.

Figure 5:
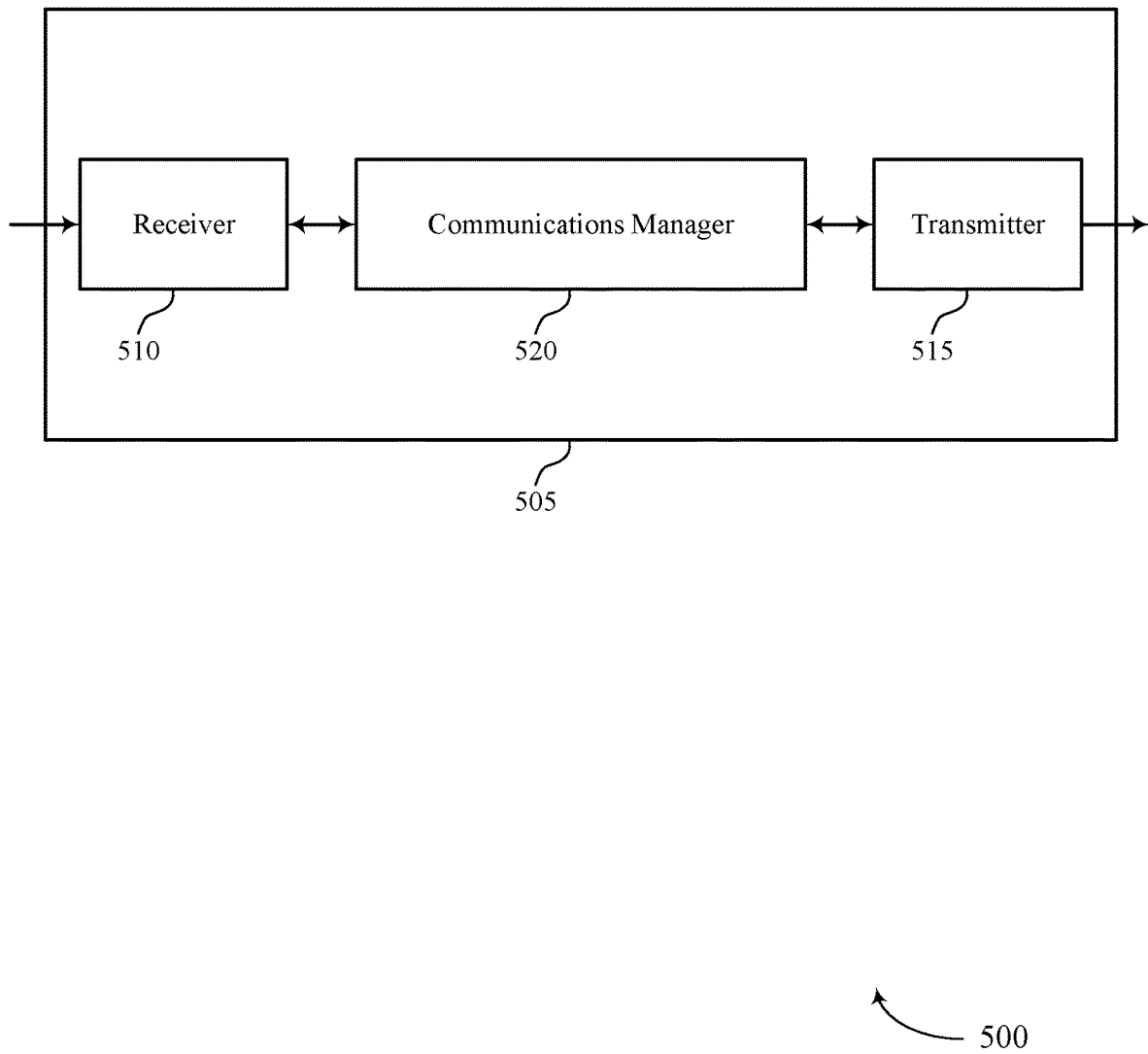
FIGS. 5 and 6 show block diagrams of devices that support directional data transmission techniques in sidelink communications in accordance with aspects of the present disclosure.

FIG. 5 shows a block diagram 500 of a device 505 that supports directional data transmission techniques in sidelink communications in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to directional data transmission techniques in sidelink communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to directional data transmission techniques in sidelink communications). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of directional data transmission techniques in sidelink communications as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first UE in accordance with examples as disclosed herein. For example, the communications manager 520 may be configured as or otherwise support a means for receiving a directional indication associated with a set of data packets that are to be transmitted in one or more communications to one or more other UEs. The communications manager 520 may be configured as or otherwise support a means for determining two or more directional traffic flows associated with two or more beams of the first UE based on the directional indication associated with the set of data packets, the two or more directional traffic flows including at least a first directional traffic flow and a second directional traffic flow. The communications manager 520 may be configured as or otherwise support a means for setting a first set of quality of service (QoS) parameters for the first directional traffic flow and a second set of QoS parameters for the second directional traffic flow based on the directional indication associated with the set of data packets.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for transmitting a data packet in relevant directions for sidelink communications. The communications manager 520 may improve network efficiencies, reduce interference, and save power by transmitting data packets only in relevant directions with QoS parameters based on directional parameters of the data.

Figure 6:
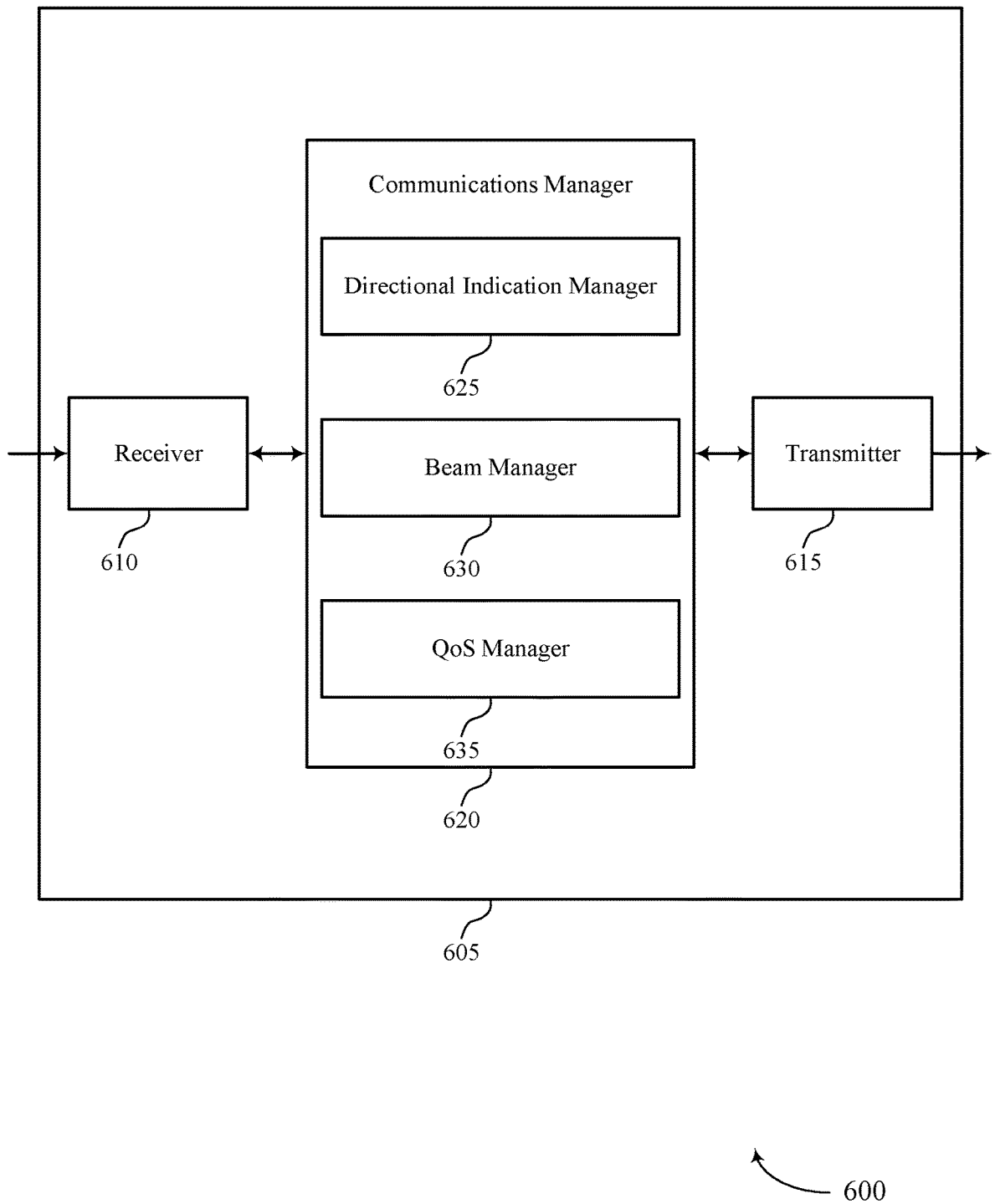

FIG. 6 shows a block diagram 600 of a device 605 that supports directional data transmission techniques in sidelink communications in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to directional data transmission techniques in sidelink communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to directional data transmission techniques in sidelink communications). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of directional data transmission techniques in sidelink communications as described herein. For example, the communications manager 620 may include a directional indication manager 625, a beam manager 630, a QoS manager 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first UE in accordance with examples as disclosed herein. The directional indication manager 625 may be configured as or otherwise support a means for receiving a directional indication associated with a set of data packets that are to be transmitted in one or more communications to one or more other UEs. The beam manager 630 may be configured as or otherwise support a means for determining two or more directional traffic flows associated with two or more beams of the first UE based on the directional indication associated with the set of data packets, the two or more directional traffic flows including at least a first directional traffic flow and a second directional traffic flow. The QoS manager 635 may be configured as or otherwise support a means for setting a first set of quality of service (QoS) parameters for the first directional traffic flow and a second set of QoS parameters for the second directional traffic flow based on the directional indication associated with the set of data packets.

Figure 7:
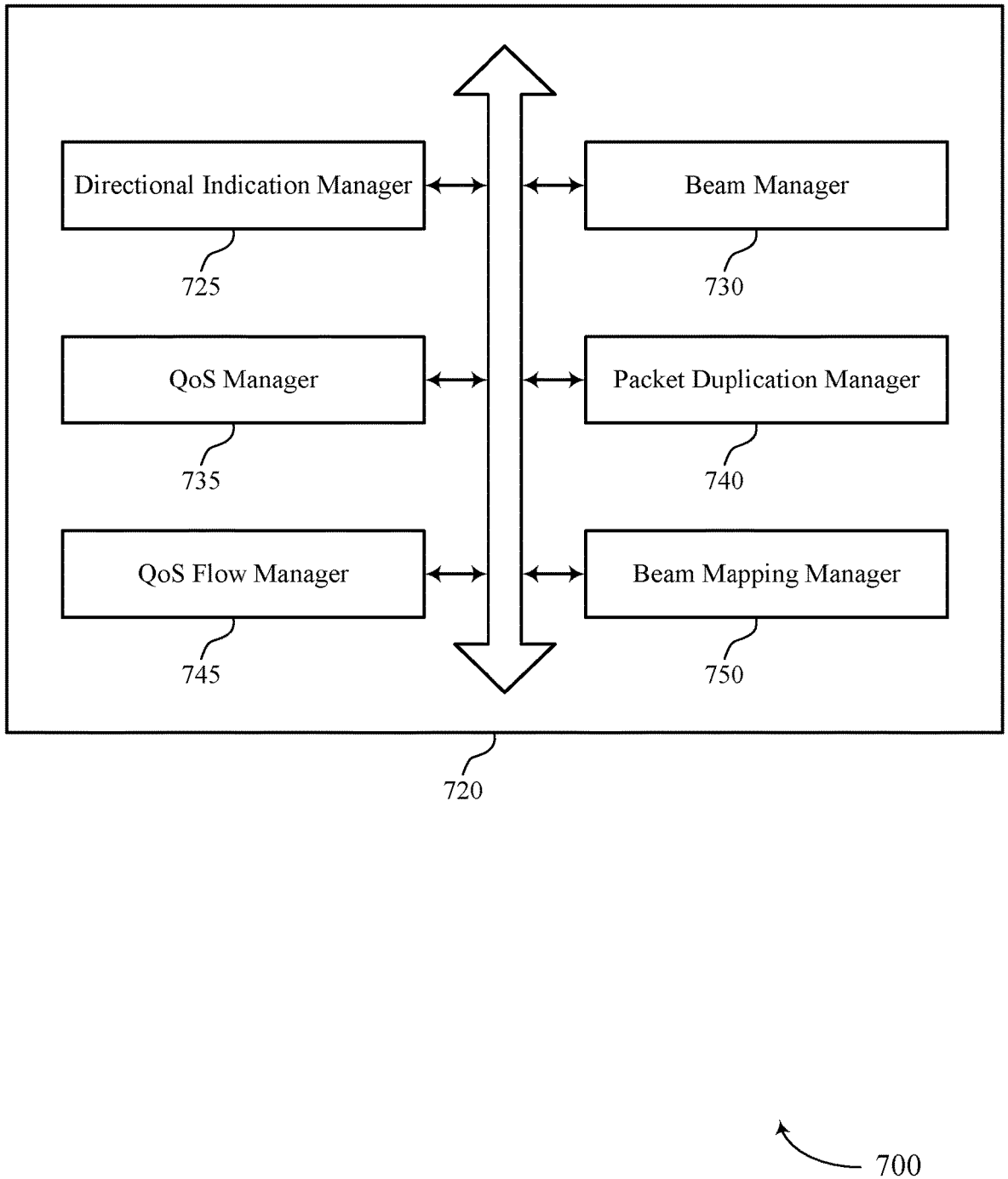
FIG. 7 shows a block diagram of a communications manager that supports directional data transmission techniques in sidelink communications in accordance with aspects of the present disclosure.

FIG. 7 shows a block diagram 700 of a communications manager 720 that supports directional data transmission techniques in sidelink communications in accordance with aspects of the present disclosure. The communications manager 720 may be an example of aspects of a communications manager 520, a communications manager 620, or both, as described herein. The communications manager 720, or various components thereof, may be an example of means for performing various aspects of directional data transmission techniques in sidelink communications as described herein. For example, the communications manager 720 may include a directional indication manager 725, a beam manager 730, a QoS manager 735, a packet duplication manager 740, a QoS flow manager 745, a beam mapping manager 750, or any combination thereof. Each of these components may communicate, directly or indirectly, with one another (e.g., via one or more buses).

The communications manager 720 may support wireless communication at a first UE in accordance with examples as disclosed herein. The directional indication manager 725 may be configured as or otherwise support a means for receiving a directional indication associated with a set of data packets that are to be transmitted in one or more communications to one or more other UEs. The beam manager 730 may be configured as or otherwise support a means for determining two or more directional traffic flows associated with two or more beams of the first UE based on the directional indication associated with the set of data packets, the two or more directional traffic flows including at least a first directional traffic flow and a second directional traffic flow. The QoS manager 735 may be configured as or otherwise support a means for setting a first set of quality of service (QoS) parameters for the first directional traffic flow and a second set of QoS parameters for the second directional traffic flow based on the directional indication associated with the set of data packets.

In some examples, the packet duplication manager 740 may be configured as or otherwise support a means for duplicating the set of data packets for each of the two or more directional traffic flows. In some examples, the QoS flow manager 745 may be configured as or otherwise support a means for transmitting the set of data packets on each of the first directional traffic flow and the second directional traffic flow, where each directional traffic flow of the two or more directional traffic flows are independently processed according to the respective set of QoS parameters of the associated directional traffic flow. In some examples, the directional indication is received from an application layer of the first UE, and where the determining and setting are performed at a V2X layer of the first UE.

In some examples, to support determining the two or more directional traffic flows, the beam manager 730 may be configured as or otherwise support a means for receiving, from an access stratum layer of the first UE, a mapping of a first precoder to a first beam having a first directional relationship with the first UE and a second precoder to a second beam having a second directional relationship with the first UE. In some examples, to support determining the two or more directional traffic flows, the beam mapping manager 750 may be configured as or otherwise support a means for mapping the first directional traffic flow to the first precoder based on the first directional traffic flow having the first directional relationship with the first UE. In some examples, to support determining the two or more directional traffic flows, the beam mapping manager 750 may be configured as or otherwise support a means for mapping the second directional traffic flow to the second precoder based on the second directional traffic flow having the second directional relationship with the first UE.

In some examples, the first set of QoS parameters include one or more of a first priority, a first latency target, a first reliability target, a first distance range for feedback operations, or any combinations thereof. In some examples, the second set of QoS parameters are determined independently of the first set of QoS parameters and include one or more of a second priority, a second latency target, a second reliability target, a second distance range for feedback operations, or any combinations thereof. In some examples, the directional indication associated with the set of data packets indicates one or more directions relative to a direction of motion of the first UE, or relative to a reference direction heading. In some examples, the directional indication associated with the set of data packets indicates two or more directions that each have an associated set of QoS targets, and where the two or more directions are mapped to two or more transmission beams that are to be used to transmit the first directional traffic flow and the second directional traffic flow.

In some examples, a quantity of directional traffic flows that are available to the first UE is determined based on a capability of the first UE for concurrent transmission using two or more precoders, a number of available transmission/reception points for communications with the other UEs, or any combinations thereof. In some examples, the first directional traffic flow is mapped to a first transmission beam and the second directional traffic flow is mapped to a second transmission beam, and where the first set of QoS parameters and the second set of QoS parameters are configured independently of each other. In some examples, a first transmission precoder associated with the first transmission beam and the first set of QoS parameters are provided as attributes to each packet in the first directional traffic flow that are passed to a lower layer of the first UE for use in transmission of each respective packet. In some examples, a second transmission precoder associated with the second transmission beam and the second set of QoS parameters are provided as attributes to each packet in the second directional traffic flow that are passed to the lower layer of the first UE for use in transmission of each respective packet.

In some examples, the QoS flow manager 745 may be configured as or otherwise support a means for determining that two or more packets of the set of data packets have different QoS parameters and are to be transmitted in the first directional traffic flow. In some examples, the QoS flow manager 745 may be configured as or otherwise support a means for selecting a more stringent QoS parameter associated with the two or more packets for inclusion with the first set of QoS parameters. In some examples, two or more packets having different QoS parameters and are not permitted to be transmitted in a single directional traffic flow. In some examples, the first directional traffic flow and the second directional traffic flow are configured based on a mapping between the directional indication and one or more of a predetermined set of QoS parameters, a set of precoding parameters associated with different directional traffic flows, or any combinations thereof. In some examples, each of the two or more directional traffic flows are mapped to a different sidelink radio bearer, and where the respective set of QoS parameters are configured as part of a sidelink radio bearer configuration.

In some examples, the directional indication indicates different QoS targets for each of two or more different directions relative to a direction associated with the first UE, and where each of the two or more different directions are mapped to a different directional traffic flow of the two or more directional traffic flows. In some examples, the directional indication indicates different QoS targets for each of a set of multiple different directions relative to a direction associated with the first UE, and two or more different directions of the set of multiple different directions are mapped to the first directional traffic flow, and where the first set of QoS parameters are based on more stringent QoS targets of the two or more different directions that are mapped to the first directional traffic flow.

Figure 8:
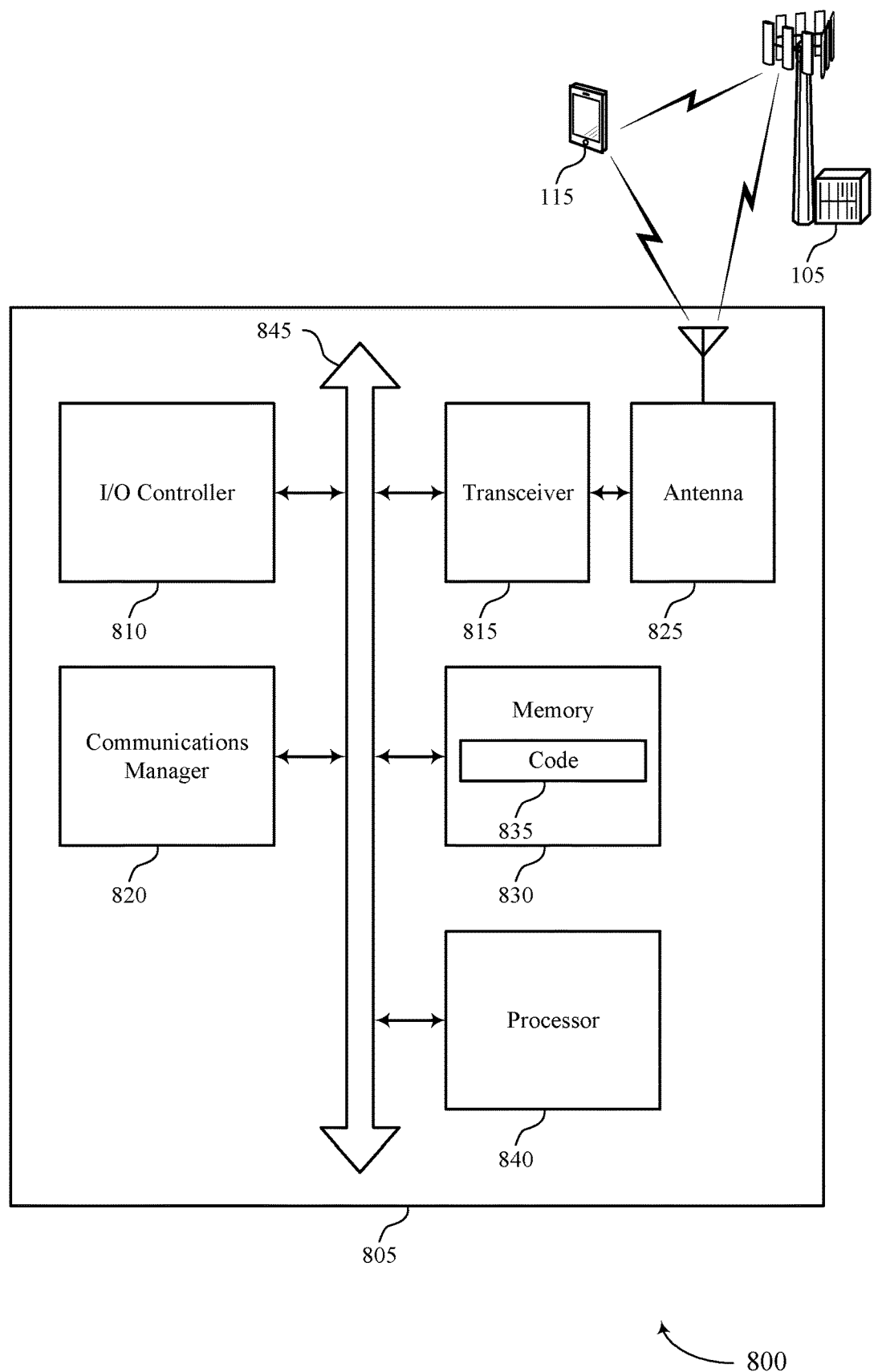
FIG. 8 shows a diagram of a system including a device that supports directional data transmission techniques in sidelink communications in accordance with aspects of the present disclosure.

FIG. 8 shows a diagram of a system 800 including a device 805 that supports directional data transmission techniques in sidelink communications in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting directional data transmission techniques in sidelink communications). For example, the device 805 or a component of the device 805 may include a processor 840 and memory 830 coupled to the processor 840, the processor 840 and memory 830 configured to perform various functions described herein.

The communications manager 820 may support wireless communication at a first UE in accordance with examples as disclosed herein. For example, the communications manager 820 may be configured as or otherwise support a means for receiving a directional indication associated with a set of data packets that are to be transmitted in one or more communications to one or more other UEs. The communications manager 820 may be configured as or otherwise support a means for determining two or more directional traffic flows associated with two or more beams of the first UE based on the directional indication associated with the set of data packets, the two or more directional traffic flows including at least a first directional traffic flow and a second directional traffic flow. The communications manager 820 may be configured as or otherwise support a means for setting a first set of quality of service (QoS) parameters for the first directional traffic flow and a second set of QoS parameters for the second directional traffic flow based on the directional indication associated with the set of data packets.

By including or configuring the communications manager 820 in accordance with examples as described herein, the device 805 may support techniques for multiple QoS flows of directional data packets that provide improved communication reliability, reduced latency, improved user experience related to reduced processing, reduced power consumption, more efficient utilization of communication resources, improved coordination between devices, longer battery life, and improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of directional data transmission techniques in sidelink communications as described herein, or the processor 840 and the memory 830 may be otherwise configured to perform or support such operations.

Figure 9:
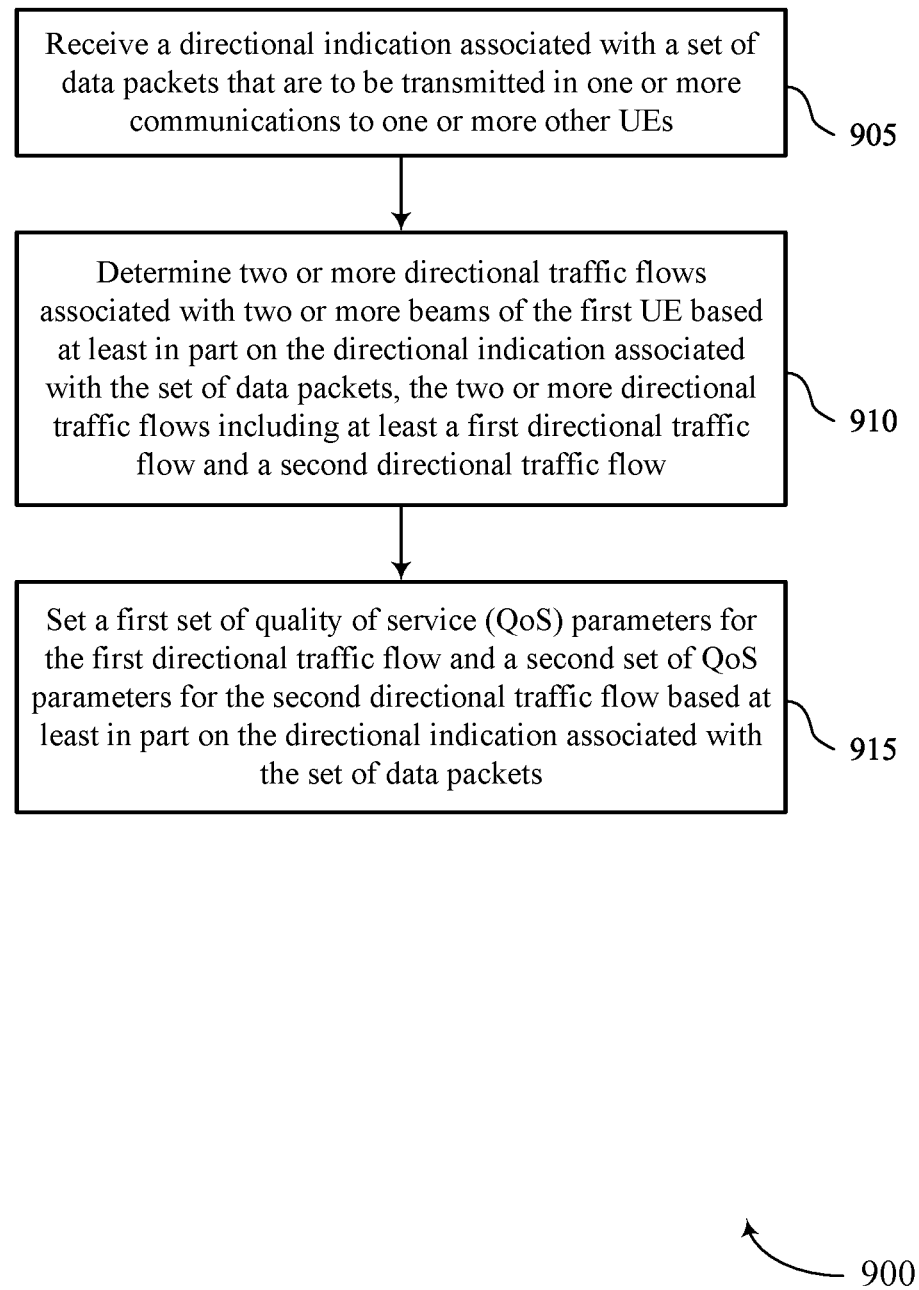
FIGS. 9 through 12 show flowcharts illustrating methods that support directional data transmission techniques in sidelink communications in accordance with aspects of the present disclosure.

FIG. 9 shows a flowchart illustrating a method 900 that supports directional data transmission techniques in sidelink communications in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include receiving a directional indication associated with a set of data packets that are to be transmitted in one or more communications to one or more other UEs. The operations of 905 may be performed in accordance with examples as disclosed herein. In some examples, aspects of the operations of 905 may be performed by a directional indication manager 725 as described with reference to FIG. 7.

At 910, the method may include determining two or more directional traffic flows associated with two or more beams of the first UE based on the directional indication associated with the set of data packets, the two or more directional traffic flows including at least a first directional traffic flow and a second directional traffic flow. The operations of 910 may be performed in accordance with examples as disclosed herein. In some examples, aspects of the operations of 910 may be performed by a beam manager 730 as described with reference to FIG. 7.

At 915, the method may include setting a first set of quality of service (QoS) parameters for the first directional traffic flow and a second set of QoS parameters for the second directional traffic flow based on the directional indication associated with the set of data packets. The operations of 915 may be performed in accordance with examples as disclosed herein. In some examples, aspects of the operations of 915 may be performed by a QoS manager 735 as described with reference to FIG. 7.

Figure 10:
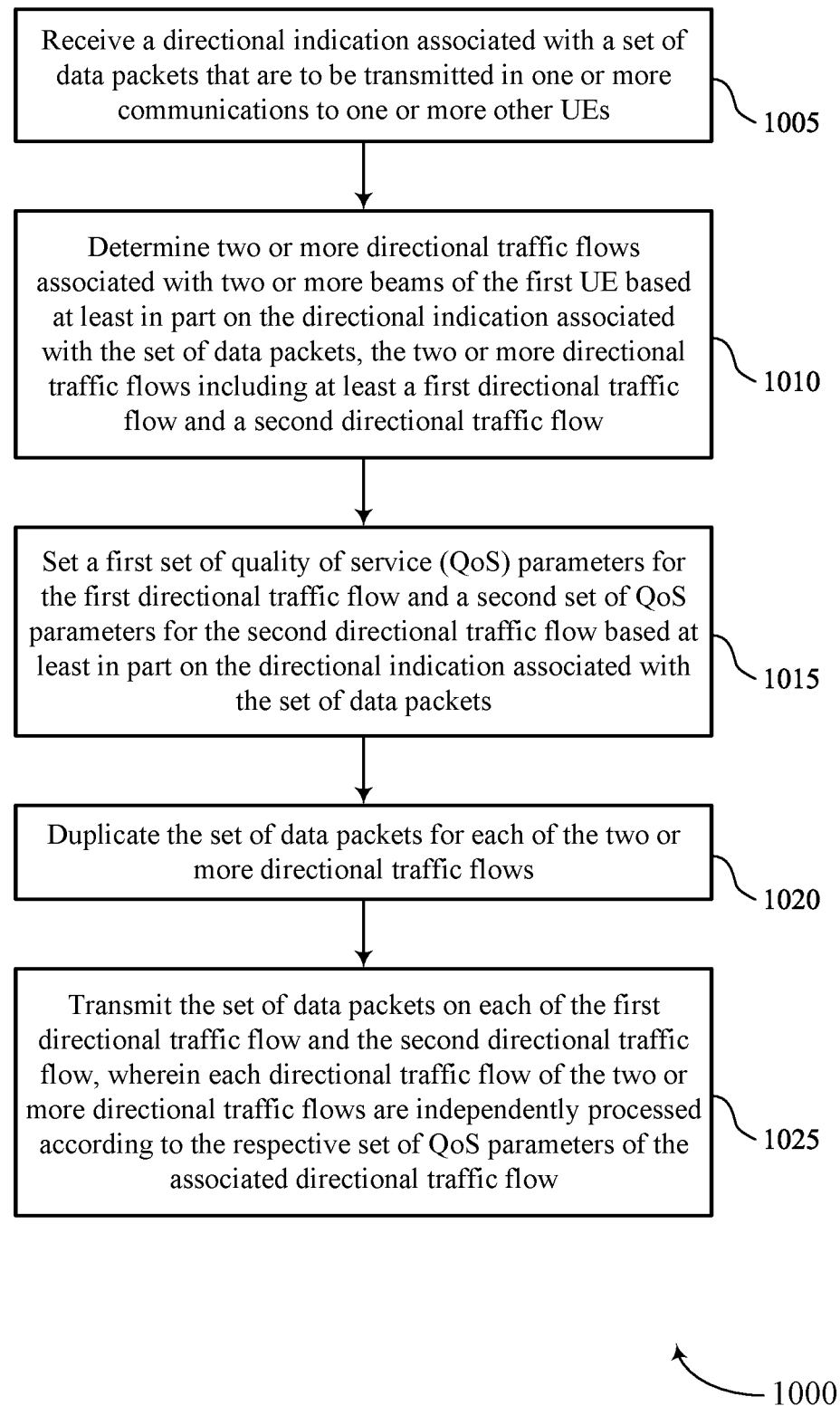

FIG. 10 shows a flowchart illustrating a method 1000 that supports directional data transmission techniques in sidelink communications in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include receiving a directional indication associated with a set of data packets that are to be transmitted in one or more communications to one or more other UEs. The operations of 1005 may be performed in accordance with examples as disclosed herein. In some examples, aspects of the operations of 1005 may be performed by a directional indication manager 725 as described with reference to FIG. 7.

At 1010, the method may include determining two or more directional traffic flows associated with two or more beams of the first UE based on the directional indication associated with the set of data packets, the two or more directional traffic flows including at least a first directional traffic flow and a second directional traffic flow. The operations of 1010 may be performed in accordance with examples as disclosed herein. In some examples, aspects of the operations of 1010 may be performed by a beam manager 730 as described with reference to FIG. 7.

At 1015, the method may include setting a first set of quality of service (QoS) parameters for the first directional traffic flow and a second set of QoS parameters for the second directional traffic flow based on the directional indication associated with the set of data packets. The operations of 1015 may be performed in accordance with examples as disclosed herein. In some examples, aspects of the operations of 1015 may be performed by a QoS manager 735 as described with reference to FIG. 7.

At 1020, the method may include duplicating the set of data packets for each of the two or more directional traffic flows. The operations of 1020 may be performed in accordance with examples as disclosed herein. In some examples, aspects of the operations of 1020 may be performed by a packet duplication manager 740 as described with reference to FIG. 7.

At 1025, the method may include transmitting the set of data packets on each of the first directional traffic flow and the second directional traffic flow, where each directional traffic flow of the two or more directional traffic flows are independently processed according to the respective set of QoS parameters of the associated directional traffic flow. The operations of 1025 may be performed in accordance with examples as disclosed herein. In some examples, aspects of the operations of 1025 may be performed by a QoS flow manager 745 as described with reference to FIG. 7.

Figure 11:
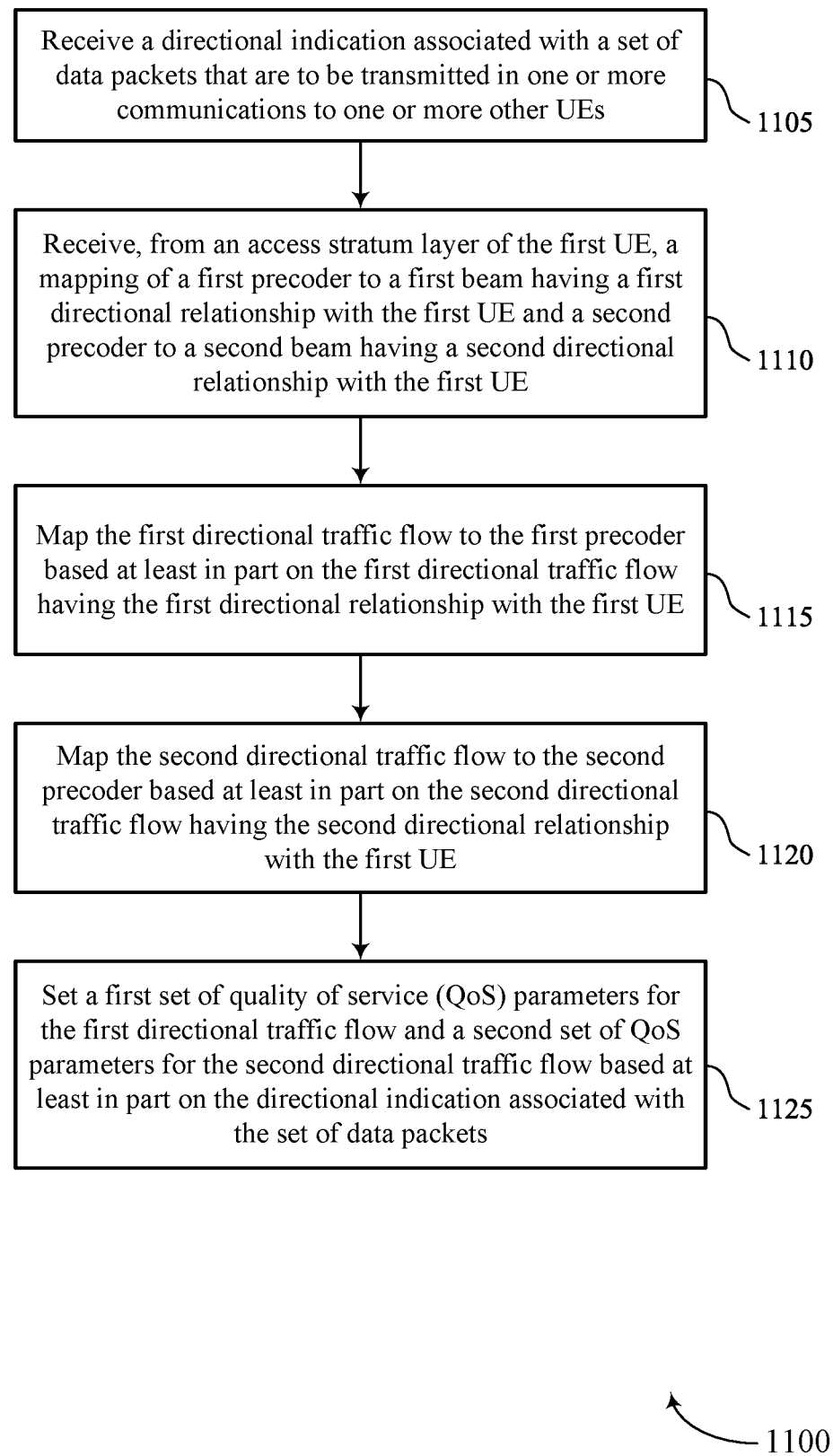

FIG. 11 shows a flowchart illustrating a method 1100 that supports directional data transmission techniques in sidelink communications in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include receiving a directional indication associated with a set of data packets that are to be transmitted in one or more communications to one or more other UEs. The operations of 1105 may be performed in accordance with examples as disclosed herein. In some examples, aspects of the operations of 1105 may be performed by a directional indication manager 725 as described with reference to FIG. 7.

At 1110, the method may include receiving, from an access stratum layer of the first UE, a mapping of a first precoder to a first beam having a first directional relationship with the first UE and a second precoder to a second beam having a second directional relationship with the first UE. The operations of 1110 may be performed in accordance with examples as disclosed herein. In some examples, aspects of the operations of 1110 may be performed by a beam manager 730 as described with reference to FIG. 7.

At 1115, the method may include mapping the first directional traffic flow to the first precoder based on the first directional traffic flow having the first directional relationship with the first UE. The operations of 1115 may be performed in accordance with examples as disclosed herein. In some examples, aspects of the operations of 1115 may be performed by a beam mapping manager 750 as described with reference to FIG. 7.

At 1120, the method may include mapping the second directional traffic flow to the second precoder based on the second directional traffic flow having the second directional relationship with the first UE. The operations of 1120 may be performed in accordance with examples as disclosed herein. In some examples, aspects of the operations of 1120 may be performed by a beam mapping manager 750 as described with reference to FIG. 7.

At 1125, the method may include setting a first set of quality of service (QoS) parameters for the first directional traffic flow and a second set of QoS parameters for the second directional traffic flow based on the directional indication associated with the set of data packets. The operations of 1125 may be performed in accordance with examples as disclosed herein. In some examples, aspects of the operations of 1125 may be performed by a QoS manager 735 as described with reference to FIG. 7.

Figure 12:
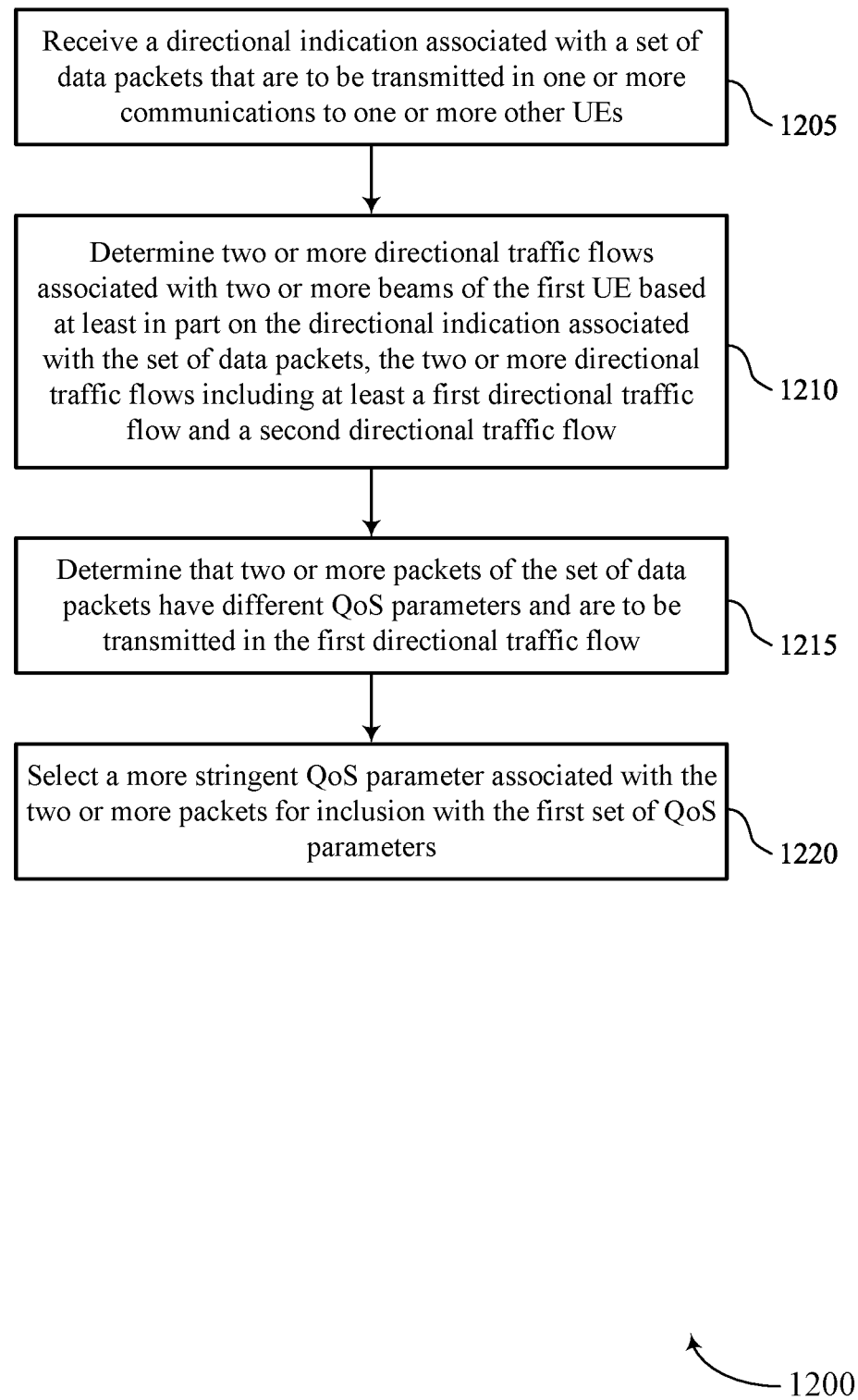

FIG. 12 shows a flowchart illustrating a method 1200 that supports directional data transmission techniques in sidelink communications in accordance with aspects of the present disclosure. The operations of the method 1200 may be implemented by a UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1205, the method may include receiving a directional indication associated with a set of data packets that are to be transmitted in one or more communications to one or more other UEs. The operations of 1205 may be performed in accordance with examples as disclosed herein. In some examples, aspects of the operations of 1205 may be performed by a directional indication manager 725 as described with reference to FIG. 7.

At 1210, the method may include determining two or more directional traffic flows associated with two or more beams of the first UE based on the directional indication associated with the set of data packets, the two or more directional traffic flows including at least a first directional traffic flow and a second directional traffic flow. The operations of 1210 may be performed in accordance with examples as disclosed herein. In some examples, aspects of the operations of 1210 may be performed by a beam manager 730 as described with reference to FIG. 7.

At 1215, the method may include determining that two or more packets of the set of data packets have different QoS parameters and are to be transmitted in the first directional traffic flow. The operations of 1215 may be performed in accordance with examples as disclosed herein. In some examples, aspects of the operations of 1215 may be performed by a QoS flow manager 745 as described with reference to FIG. 7.

At 1220, the method may include selecting a more stringent QoS parameter associated with the two or more packets for inclusion with the first set of QoS parameters. The operations of 1220 may be performed in accordance with examples as disclosed herein. In some examples, aspects of the operations of 1220 may be performed by a QoS flow manager 745 as described with reference to FIG. 7.

The following provides an overview of aspects of the present disclosure:

Aspect 1: A method for wireless communication at a first UE, comprising: receiving a directional indication associated with a set of data packets that are to be transmitted in one or more communications to one or more other UEs; determining two or more directional traffic flows associated with two or more beams of the first UE based at least in part on the directional indication associated with the set of data packets, the two or more directional traffic flows including at least a first directional traffic flow and a second directional traffic flow; and setting a first set of quality of service (QoS) parameters for the first directional traffic flow and a second set of QoS parameters for the second directional traffic flow based at least in part on the directional indication associated with the set of data packets.

Aspect 2: The method of aspect 1, further comprising: duplicating the set of data packets for each of the two or more directional traffic flows; and transmitting the set of data packets on each of the first directional traffic flow and the second directional traffic flow, wherein each directional traffic flow of the two or more directional traffic flows are independently processed according to the respective set of QoS parameters of the associated directional traffic flow.

Aspect 3: The method of any of aspects 1 through 2, wherein the directional indication is received from an application layer of the first UE, and wherein the determining and setting are performed at a vehicle-to-everything (V2X) layer of the first UE.

Aspect 4: The method of any of aspects 1 through 3, wherein the determining the two or more directional traffic flows comprises: receiving, from an access stratum layer of the first UE, a mapping of a first precoder to a first beam having a first directional relationship with the first UE and a second precoder to a second beam having a second directional relationship with the first UE; mapping the first directional traffic flow to the first precoder based at least in part on the first directional traffic flow having the first directional relationship with the first UE; and mapping the second directional traffic flow to the second precoder based at least in part on the second directional traffic flow having the second directional relationship with the first UE.

Aspect 5: The method of any of aspects 1 through 4, wherein the first set of QoS parameters include one or more of a first priority, a first latency target, a first reliability target, a first distance range for feedback operations, or any combinations thereof, and the second set of QoS parameters are determined independently of the first set of QoS parameters and include one or more of a second priority, a second latency target, a second reliability target, a second distance range for feedback operations, or any combinations thereof.

Aspect 6: The method of any of aspects 1 through 5, wherein the directional indication associated with the set of data packets indicates one or more directions relative to a direction of motion of the first UE, or relative to a reference direction heading.

Aspect 7: The method of any of aspects 1 through 6, wherein the directional indication associated with the set of data packets indicates two or more directions that each have an associated set of QoS targets, and wherein the two or more directions are mapped to two or more transmission beams that are to be used to transmit the first directional traffic flow and the second directional traffic flow.

Aspect 8: The method of any of aspects 1 through 7, wherein a quantity of directional traffic flows that are available to the first UE is determined based on a capability of the first UE for concurrent transmission using two or more precoders, a number of available transmission/reception points for communications with the other UEs, or any combinations thereof.

Aspect 9: The method of any of aspects 1 through 8, wherein the first directional traffic flow is mapped to a first transmission beam and the second directional traffic flow is mapped to a second transmission beam, and wherein the first set of QoS parameters and the second set of QoS parameters are configured independently of each other.

Aspect 10: The method of aspect 9, wherein a first transmission precoder associated with the first transmission beam and the first set of QoS parameters are provided as attributes to each packet in the first directional traffic flow that are passed to a lower layer of the first UE for use in transmission of each respective packet, and a second transmission precoder associated with the second transmission beam and the second set of QoS parameters are provided as attributes to each packet in the second directional traffic flow that are passed to the lower layer of the first UE for use in transmission of each respective packet.

Aspect 11: The method of any of aspects 1 through 10, further comprising: determining that two or more packets of the set of data packets have different QoS parameters and are to be transmitted in the first directional traffic flow; and selecting a more stringent QoS parameter associated with the two or more packets for inclusion with the first set of QoS parameters.

Aspect 12: The method of any of aspects 1 through 10, wherein two or more packets having different QoS parameters and are not permitted to be transmitted in a single directional traffic flow.

Aspect 13: The method of any of aspects 1 through 12, wherein the first directional traffic flow and the second directional traffic flow are configured based at least in part on a mapping between the directional indication and one or more of a predetermined set of QoS parameters, a set of precoding parameters associated with different directional traffic flows, or any combinations thereof Aspect 14: The method of any of aspects 1 through 13, wherein each of the two or more directional traffic flows are mapped to a different sidelink radio bearer, and wherein the respective set of QoS parameters are configured as part of a sidelink radio bearer configuration.

Aspect 15: The method of any of aspects 1 through 14, wherein the directional indication indicates different QoS targets for each of two or more different directions relative to a direction associated with the first UE, and wherein each of the two or more different directions are mapped to a different directional traffic flow of the two or more directional traffic flows.

Aspect 16: The method of any of aspects 1 through 15, wherein the directional indication indicates different QoS targets for each of a plurality of different directions relative to a direction associated with the first UE, and two or more different directions of the plurality of different directions are mapped to the first directional traffic flow, and wherein the first set of QoS parameters are based at least in part on more stringent QoS targets of the two or more different directions that are mapped to the first directional traffic flow.

Aspect 17: An apparatus for wireless communication at a first UE, comprising a processor; memory coupled with the processor; and instructions stored in the memory and executable by the processor to cause the apparatus to perform a method of any of aspects 1 through 16.

Aspect 18: An apparatus for wireless communication at a first UE, comprising at least one means for performing a method of any of aspects 1 through 16.

Aspect 19: A non-transitory computer-readable medium storing code for wireless communication at a first UE, the code comprising instructions executable by a processor to perform a method of any of aspects 1 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:
   receiving a directional indication associated with a set of data packets that are to be transmitted in one or more communications to one or more other UEs;
   determining two or more directional traffic flows associated with two or more beams of the first UE based at least in part on the directional indication associated with the set of data packets, the two or more directional traffic flows including at least a first directional traffic flow and a second directional traffic flow;
   setting a first set of quality of service (QoS) parameters for the first directional traffic flow and a second set of QoS parameters for the second directional traffic flow based at least in part on the directional indication associated with the set of data packets; and
   duplicating the set of data packets for each of the two or more directional traffic flows; and
   transmitting the set of data packets on each of the first directional traffic flow and the second directional traffic flow, wherein each directional traffic flow of the two or more directional traffic flows are independently processed according to the respective set of QoS parameters of the associated directional traffic flow.

2. The method of claim 1, wherein the directional indication is received from an application layer of the first UE, and wherein the determining and setting are performed at a vehicle-to-everything (V2X) layer of the first UE.

3. The method of claim 1, wherein the determining the two or more directional traffic flows comprises:
   receiving, from an access stratum layer of the first UE, a mapping of a first precoder to a first beam having a first directional relationship with the first UE and a second precoder to a second beam having a second directional relationship with the first UE;
   mapping the first directional traffic flow to the first precoder based at least in part on the first directional traffic flow having the first directional relationship with the first UE; and
   mapping the second directional traffic flow to the second precoder based at least in part on the second directional traffic flow having the second directional relationship with the first UE.

4. The method of claim 1, wherein:
the first set of QoS parameters include one or more of a first priority, a first latency target, a first reliability target, a first distance range for feedback operations, or any combinations thereof, and
the second set of QoS parameters are determined independently of the first set of QoS parameters and include one or more of a second priority, a second latency target, a second reliability target, a second distance range for feedback operations, or any combinations thereof.

5. The method of claim 1, wherein the directional indication associated with the set of data packets indicates one or more directions relative to a direction of motion of the first UE, or relative to a reference direction heading.

6. The method of claim 1, wherein the directional indication associated with the set of data packets indicates two or more directions that each have an associated set of QoS targets, and wherein the two or more directions are mapped to the two or more beams that are to be used to transmit the first directional traffic flow and the second directional traffic flow.

7. The method of claim 1, wherein a quantity of directional traffic flows that are available to the first UE is determined based on a capability of the first UE for concurrent transmission using two or more precoders, a number of available transmission/reception points for communications with the other UEs, or any combinations thereof.

8. The method of claim 1, wherein the first directional traffic flow is mapped to a first transmission beam and the second directional traffic flow is mapped to a second transmission beam, and wherein the first set of QoS parameters and the second set of QoS parameters are configured independently of each other.

9. The method of claim 8, wherein:
a first transmission precoder associated with the first transmission beam and the first set of QoS parameters are provided as attributes to each packet in the first directional traffic flow that are passed to a lower layer of the first UE for use in transmission of each respective packet, and
a second transmission precoder associated with the second transmission beam and the second set of QoS parameters are provided as attributes to each packet in the second directional traffic flow that are passed to the lower layer of the first UE for use in transmission of each respective packet.

10. The method of claim 1, further comprising:
determining that two or more packets of the set of data packets have different QoS parameters and are to be transmitted in the first directional traffic flow; and
selecting a more stringent QoS parameter associated with the two or more packets for inclusion with the first set of QoS parameters.

11. The method of claim 1, wherein two or more packets having different QoS parameters and are not permitted to be transmitted in a single directional traffic flow.

12. The method of claim 1, wherein the first directional traffic flow and the second directional traffic flow are configured based at least in part on a mapping between the directional indication and one or more of a predetermined set of QoS parameters, a set of precoding parameters associated with different directional traffic flows, or any combinations thereof.

13. The method of claim 1, wherein each of the two or more directional traffic flows are mapped to a different sidelink radio bearer, and wherein the respective set of QoS parameters are configured as part of a sidelink radio bearer configuration.

14. The method of claim 1, wherein the directional indication indicates different QoS targets for each of two or more different directions relative to a direction associated with the first UE, and wherein each of the two or more different directions are mapped to a different directional traffic flow of the two or more directional traffic flows.

15. The method of claim 1, wherein the directional indication indicates different QoS targets for each of a plurality of different directions relative to a direction associated with the first UE, and two or more different directions of the plurality of different directions are mapped to the first directional traffic flow, and wherein the first set of QoS parameters are based at least in part on more stringent QoS targets of the two or more different directions that are mapped to the first directional traffic flow.

16. An apparatus for wireless communication at a first user equipment (UE), comprising:
a processor;
one or more memories coupled with the processor; and
instructions stored in the memory and executable by the processor to cause the apparatus to:
receive a directional indication associated with a set of data packets that are to be transmitted in one or more communications to one or more other UEs;
determine two or more directional traffic flows associated with two or more beams of the first UE based at least in part on the directional indication associated with the set of data packets, the two or more directional traffic flows including at least a first directional traffic flow and a second directional traffic flow;
set a first set of quality of service (QoS) parameters for the first directional traffic flow and a second set of QoS parameters for the second directional traffic flow based at least in part on the directional indication associated with the set of data packets; and
duplicate the set of data packets for each of the two or more directional traffic flows; and
transmit the set of data packets on each of the first directional traffic flow and the second directional traffic flow, wherein each directional traffic flow of the two or more directional traffic flows are independently processed according to the respective set of QoS parameters of the associated directional traffic flow.

17. The apparatus of claim 16, wherein the instructions to determine the two or more directional traffic flows are executable by the processor to cause the apparatus to:
receive, from an access stratum layer of the first UE, a mapping of a first precoder to a first beam having a first directional relationship with the first UE and a second precoder to a second beam having a second directional relationship with the first UE;
map the first directional traffic flow to the first precoder based at least in part on the first directional traffic flow having the first directional relationship with the first UE; and
map the second directional traffic flow to the second precoder based at least in part on the second directional traffic flow having the second directional relationship with the first UE.

18. The apparatus of claim 16, wherein:
the first set of QoS parameters include one or more of a first priority, a first latency target, a first reliability target, a first distance range for feedback operations, or any combinations thereof, and the second set of QoS parameters are determined independently of the first set of QoS parameters and include one or more of a second priority, a second latency target, a second reliability target, a second distance range for feedback operations, or any combinations thereof.

19. The apparatus of claim 16, wherein the directional indication associated with the set of data packets indicates two or more directions that each have an associated set of QoS targets, and wherein the two or more directions are mapped to the two or more beams that are to be used to transmit the first directional traffic flow and the second directional traffic flow.

20. The apparatus of claim 16, wherein the first directional traffic flow is mapped to a first transmission beam and the second directional traffic flow is mapped to a second transmission beam, and wherein the first set of QoS parameters and the second set of QoS parameters are configured independently of each other.

21. The apparatus of claim 20, wherein:
a first transmission precoder associated with the first transmission beam and the first set of QoS parameters are provided as attributes to each packet in the first directional traffic flow that are passed to a lower layer of the first UE for use in transmission of each respective packet, and
a second transmission precoder associated with the second transmission beam and the second set of QoS parameters are provided as attributes to each packet in the second directional traffic flow that are passed to the lower layer of the first UE for use in transmission of each respective packet.

22. The apparatus of claim 16, wherein the first directional traffic flow and the second directional traffic flow are configured based at least in part on a mapping between the directional indication and one or more of a predetermined set of QoS parameters, a set of precoding parameters associated with different directional traffic flows, or any combinations thereof.

23. The apparatus of claim 16, wherein each of the two or more directional traffic flows are mapped to a different sidelink radio bearer, and wherein the respective set of QoS parameters are configured as part of a sidelink radio bearer configuration.

24. The apparatus of claim 16, wherein the directional indication indicates different QoS targets for each of a plurality of different directions relative to a direction associated with the first UE, and two or more different directions of the plurality of different directions are mapped to the first directional traffic flow, and wherein the first set of QoS parameters are based at least in part on more stringent QoS targets of the two or more different directions that are mapped to the first directional traffic flow.

25. An apparatus for wireless communication at a first user equipment (UE), comprising:
means for receiving a directional indication associated with a set of data packets that are to be transmitted in one or more communications to one or more other UEs;
means for determining two or more directional traffic flows associated with two or more beams of the first UE based at least in part on the directional indication associated with the set of data packets, the two or more directional traffic flows including at least a first directional traffic flow and a second directional traffic flow;
means for setting a first set of quality of service (QoS) parameters for the first directional traffic flow and a second set of QoS parameters for the second directional traffic flow based at least in part on the directional indication associated with the set of data packets; and
means for duplicating the set of data packets for each of the two or more directional traffic flows; and
means for transmitting the set of data packets on each of the first directional traffic flow and the second directional traffic flow, wherein each directional traffic flow of the two or more directional traffic flows are independently processed according to the respective set of QoS parameters of the associated directional traffic flow.

26. A non-transitory computer-readable medium storing code for wireless communication at a first user equipment (UE), the code comprising instructions executable by a processor to:
receive a directional indication associated with a set of data packets that are to be transmitted in one or more communications to one or more other UEs;
determine two or more directional traffic flows associated with two or more beams of the first UE based at least in part on the directional indication associated with the set of data packets, the two or more directional traffic flows including at least a first directional traffic flow and a second directional traffic flow;
set a first set of quality of service (QoS) parameters for the first directional traffic flow and a second set of QoS parameters for the second directional traffic flow based at least in part on the directional indication associated with the set of data packets; and
duplicate the set of data packets for each of the two or more directional traffic flows; and
transmit the set of data packets on each of the first directional traffic flow and the second directional traffic flow, wherein each directional traffic flow of the two or more directional traffic flows are independently processed according to the respective set of QoS parameters of the associated directional traffic flow.

* * * * *